US008842225B2

(12) United States Patent
Murakami et al.

(10) Patent No.: US 8,842,225 B2
(45) Date of Patent: Sep. 23, 2014

(54) SWITCHING POWER SUPPLY DEVICE

(71) Applicant: Rohm Co., Ltd., Kyoto (JP)

(72) Inventors: Kazuhiro Murakami, Kyoto (JP); Shinji Kawata, Kyoto (JP); Kiminobu Sato, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 13/892,778

(22) Filed: May 13, 2013

(65) Prior Publication Data

US 2013/0308061 A1  Nov. 21, 2013

(30) Foreign Application Priority Data

| May 14, 2012 | (JP) | ................................. 2012-110795 |
| Jul. 4, 2012 | (JP) | ................................. 2012-150891 |
| Oct. 23, 2012 | (JP) | ................................. 2012-233776 |
| Jan. 18, 2013 | (JP) | ................................. 2013-007023 |

(51) Int. Cl.

| G06F 3/038 | (2013.01) |
| G09G 5/00 | (2006.01) |
| H04N 5/63 | (2006.01) |
| G05F 1/00 | (2006.01) |
| H02M 3/158 | (2006.01) |
| H04N 5/50 | (2006.01) |
| H02M 3/156 | (2006.01) |

(52) U.S. Cl.
CPC .............. *H02M 3/1582* (2013.01); *H04N 5/50* (2013.01); *H04N 5/63* (2013.01); *H02M 3/156* (2013.01)
USPC ............ 348/730; 345/211; 323/271; 323/282

(58) Field of Classification Search
CPC ..................... H02M 3/156; H02M 2001/0032; H04N 5/63; Y02B 70/16; G09G 2330/021; G09G 2330/02
USPC ..................... 348/730; 345/211; 323/271, 282
See application file for complete search history.

(56) References Cited

U.S. PATENT DOCUMENTS

| 7,019,504 | B2 * | 3/2006 | Pullen et al. ................... 323/283 |
| 7,482,793 | B2 * | 1/2009 | Stoichita ........................ 323/282 |
| 8,040,121 | B2 * | 10/2011 | Ishida et al. ................... 323/285 |
| 8,581,564 | B2 * | 11/2013 | Sumitomo ...................... 323/282 |
| 2009/0309567 | A1 * | 12/2009 | Morroni et al. ................ 323/283 |
| 2010/0019749 | A1 | 1/2010 | Katsuya et al. |
| 2011/0133711 | A1 * | 6/2011 | Murakami et al. ............. 323/282 |

(Continued)

FOREIGN PATENT DOCUMENTS

JP    2010-35316    2/2010

*Primary Examiner* — Brian Yenke
(74) *Attorney, Agent, or Firm* — Fish & Richardson P.C.

(57) ABSTRACT

A switching power supply device has a reference voltage generator for generating a reference voltage, a ripple injector for generating a ripple by use of a pulse voltage indicating the on/off state of a switching element and injecting the ripple into the reference voltage, an integrated voltage generator for generating an integrated voltage commensurate with the integrated value of the pulse voltage throughout its on/off-duty periods, a subtractor for lowering according to the integrated voltage the reference voltage before injection of the ripple or the supply voltage to a buffer that feeds the ripple injector with the pulse voltage after making its pulse height constant, a comparator for comparing a feedback voltage with the reference voltage after injection of the ripple, and a switching controller for generating an output voltage from an input voltage by non-linear control by turning on/off the switching element according to the output of the comparator.

20 Claims, 31 Drawing Sheets

(56) References Cited

U.S. PATENT DOCUMENTS

| | | | |
|---|---|---|---|
| 2011/0291626 A1* | 12/2011 | Murakami | 323/271 |
| 2012/0133344 A1* | 5/2012 | Makoto | 323/271 |
| 2012/0274300 A1* | 11/2012 | Nakashima | 323/284 |
| 2012/0274301 A1* | 11/2012 | Nakashima | 323/284 |
| 2012/0299562 A1* | 11/2012 | Noda | 323/271 |
| 2013/0038308 A1* | 2/2013 | Sumitomo | 323/283 |
| 2013/0088208 A1* | 4/2013 | Noda | 323/271 |
| 2013/0314606 A1* | 11/2013 | Murakami et al. | 348/730 |

* cited by examiner

SWITCHING POWER SUPPLY DEVICE

CROSS-REFERENCE TO RELATED APPLICATIONS

This application is based on the following Japanese Patent Applications, and the contents of which are hereby incorporated by reference:
(1) Japanese Patent Application No. 2012-110795 (the filing date: May 14, 2012)
(2) Japanese Patent Application No. 2012-150891 (the filing date: Jul. 4, 2012)
(3) Japanese Patent Application No. 2012-233776 (the filing date: Oct. 23, 2012)
(4) Japanese Patent Application No. 2013-007023 (the filing date: Jan. 18, 2013)

BACKGROUND OF THE INVENTION

1. Field of the Invention

The present invention relates to a switching power supply device of non-linear control type.

2. Description of Related Art

FIG. 31A to FIG. 31C are each a circuit block diagram and an operation waveform view that show a conventional example of a switching power supply device employing a non-linear control system; FIG. 31A illustrates a switching power supply device that employs a hysteresis window system, FIG. 31B illustrates a switching power supply device that employs a bottom detection on-time fixing system, and FIG. 31C illustrates a switching power supply device that employs an upper detection off-time fixing system. In the meantime, any of the switching power supply devices illustrated in FIG. 31A to FIG. 31C is a voltage step-down type DC/DC converter that steps down an input voltage Vin to generate a desired output voltage Vout.

The switching power supply device of the non-linear control type has a feature that allows a high load-response characteristic to be obtained with a simple circuit structure compared with a switching power supply device of linear control type (e.g., voltage mode control type and electric current mode control type).

On the other hand, as to the switching power supply device of the non-linear control type, because of a structure that performs switching control of an output transistor by using an output ripple voltage (=a ripple component of the output voltage Vout) to drive a comparator, to correctly detect the output ripple voltage, an output ripple voltage having a somewhat large amplitude (crest value) is required. Because of this, conventionally, it is essential to use an output capacitor (e.g., electrically conductive high-molecular type) whose equivalent series resistance is relatively large, which constrains component selection and incurs cost increase.

Besides, conventionally, a technology (so-called ripple injection technology) also is proposed, in which a ripple component is forcibly injected from outside into a reference voltage Vref that is input into a comparator, whereby the comparator is driven stably. If this ripple injection technology is introduced, even if the amplitude of an output ripple voltage is not very large, it is possible to perform stable switching control; therefore, it becomes possible to use a laminated ceramic capacitor small in ESR as an output capacitor.

In the meantime, as an example of the prior art related to the above description, there is JP-A-2010-35316.

But, the amplitude (peak to peak value of the ripple component) of the reference voltage into which a ripple component is injected changes in accordance with a duty of a switch voltage Vsw (pulse voltage appearing at one terminal of an output transistor) that is used for generation of the reference voltage.

Because of this, in the conventional switching power supply device, the duty of the switch voltage Vsw changes, whereby a problem is incurred, in which a DC level of the reference voltage into which the ripple component is injected changes and line regulation deteriorates.

Besides, there is also a problem with the conventional switching power supply device that an output drop due to a circuit delay occurs especially during a high frequency operation time.

SUMMARY OF THE INVENTION

In light of the above problems found by the inventor of the present application, it is an object of the present invention to provide a switching power supply device that has high output accuracy.

To achieve the above object, a switching power supply device according to the present invention includes: a reference voltage generation portion that generates a reference voltage; a ripple injection portion that uses a pulse voltage indicating on/off states of a switch device to generate a ripple component and injects the ripple component into the reference voltage; a multiplied voltage generation portion that generates a multiplied voltage in accordance with a multiplied value of an on-duty and an off-duty of the pulse voltage; a subtraction portion that pulls down, in accordance with the multiplied voltage, the reference voltage before ripple injection or a power supply voltage for a buffer that supplies the pulse voltage, which have a constant crest value, to the ripple injection portion; a comparator that compares a feedback voltage and the reference voltage after ripple injection with each other; and a switching control portion that performs on/off control of the switch device based on an output signal from the comparator to generate an output voltage from an input voltage in a non-linear control manner.

In the meantime, other features, elements, steps, advantages, and characteristics of the present invention will become more apparent from the following detailed description of preferred embodiments of the present invention with reference to the attached drawings.

DETAILED DESCRIPTION OF PREFERRED EMBODIMENTS

Hereinafter, a structural example in which the present invention is applied to a switching power supply device of COT [constant on time] type is described as an example in detail.

<Switching Power Supply Device (First Embodiment)>

Figure 1:
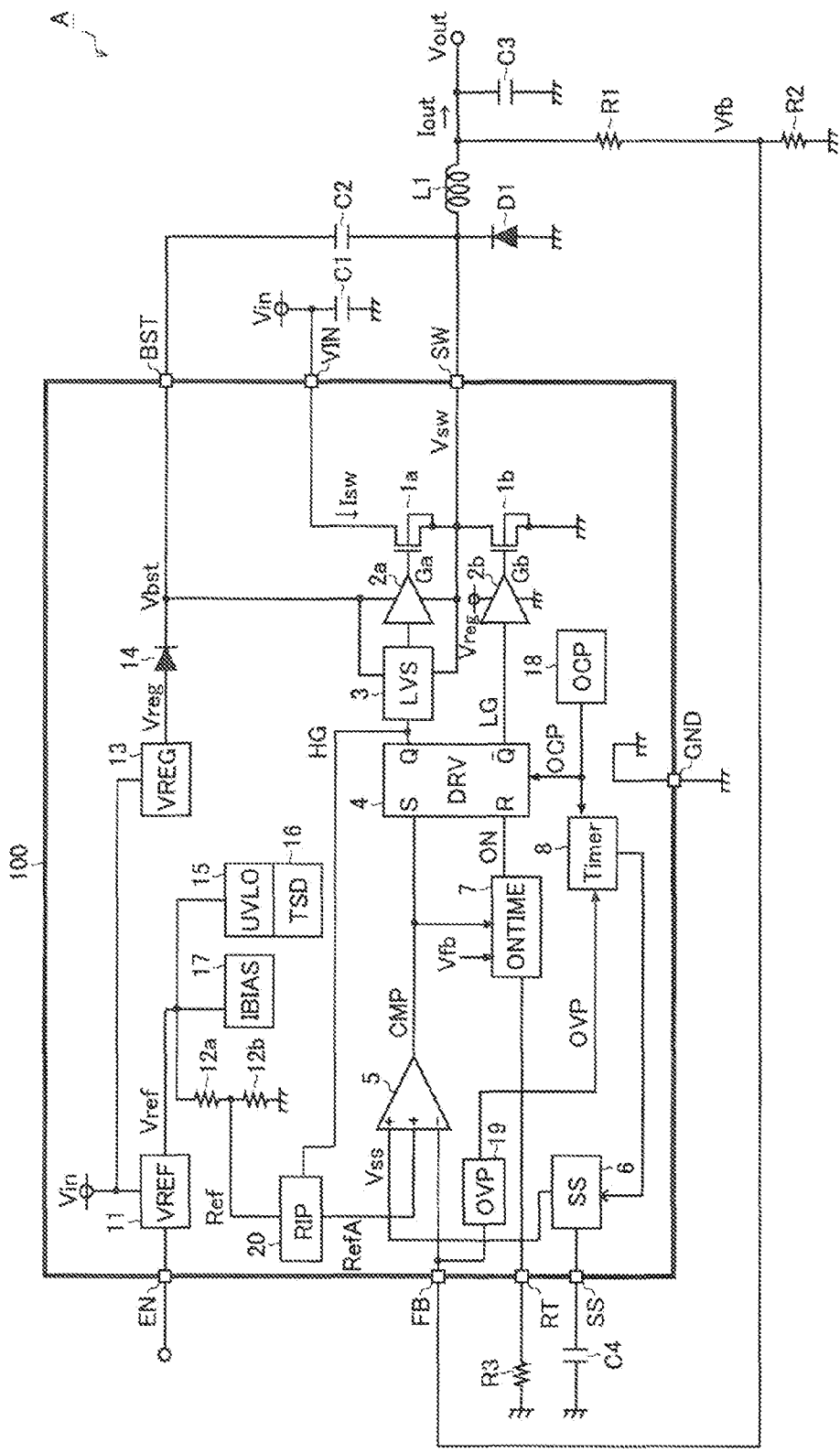
FIG. 1 is a circuit block diagram showing a first embodiment of a switching power supply device.

FIG. 1 is a circuit block diagram that shows a first embodiment of a switching power supply device. A switching power supply device A according to the present structural example is a switching power supply device of voltage step-down type that has: a switching power supply IC 100; and discrete components (inductor L, diode D1, resistors R1 to R3, and capacitors C1 to C4) externally connected to the switching power supply IC100, and generates a desired output voltage Vout from an input voltage Vin.

The switching power supply IC100 has: N channel type MOS [metal oxide semiconductor] field effect transistors 1a and 1b; drivers 2a and 2b; a level shifter 3: a drive control circuit 4; a main comparator 5; a soft start control circuit 6; an on-time setting circuit 7; a timer 8; a reference voltage generation circuit 11; resistors 12a and 12b; a constant voltage generation circuit 13; a diode 14; a low voltage lockout circuit 15; a thermal shutdown circuit 16; an input bias current generation circuit 17; an overcurrent protection circuit 18; an overvoltage protection circuit 19; and a ripple generation circuit 20.

Besides, the switching power supply IC100 has, as means for electrical connection with outside, an enable terminal EN; a feedback terminal FB; an on-time setting terminal RT; a soft start terminal SS; a bootstrap terminal BST; an input terminal VIN; a switch terminal SW; and a ground terminal GND.

Outside the switching power supply IC100, the input terminal VIN is connected to an application terminal for the input voltage Vin (e.g., 12 V) and also connected to a ground terminal via the capacitor C1. The switching terminal SW is connected to a cathode of the diode D1 and a first terminal of the inductor L1. An anode of the diode D1 is connected to the ground terminal A second terminal of the inductor L1 is connected to an application terminal for the output voltage Vout and also connected to a first terminal of the capacitor C3 and a first terminal of the resistor R1. A second terminal of the capacitor C3 is connected to the ground terminal A second terminal of the resistor R1 is connected to the ground terminal via the resistor R2. A connection node between the resistor R1 and the resistor R2 is connected, as an application terminal for a feedback voltage Vfb, to the feedback terminal FB. The capacitor C2 is connected between the switch terminal SW and the bootstrap terminal BST. The enable terminal EN is a terminal to which an enable signal for controlling the driving of the switch power supply IC100 is applied. The on-time setting terminal RT is connected to the ground terminal via the resistor R3. The soft start terminal SS is connected to the ground terminal via the capacitor C4.

In the meantime, the inductor L1, the diode D1, and the capacitor C3 function as a rectifying and smoothing circuit that rectifies and smooths a switch voltage Vsw pulled out from the switch terminal SW to generate a desired output voltage Vout. Besides, the resistors R1 and R2 function as a feedback voltage generation circuit (resistor division circuit) that generates the feedback voltage Vfb in accordance with the output voltage Vout. Besides, the capacitor C2 cooperates with the diode 14, which is later described and incorporated in the switching power supply IC100, to form a bootstrap circuit.

Next, an internal structure of the switching power supply IC100 is described.

The transistors 1a and 1b are a pair of switch devices that are connected in series between the input terminal VIN (application terminal for the input voltage Vin) and the ground terminal, and by applying a switching drive to these devices in a complementary manner, the pulse-shaped switch voltage Vsw is generated from the input voltage Vin. Specifically describing a connection relationship between both devices, a drain of the transistor 1a is connected to the input terminal VIN. A source and back gate of the transistor 1a are connected to the switch terminal SW. A drain of the transistor 1b is connected to the switch terminal SW. A source and back gate of the transistor 1b are connected to the ground terminal.

In the meantime, the term "complementary" used in the present specification covers a case where the transistors 1a and 1b are completely reverse to each other in on/off state and also a case where a predetermined delay is given to on/off transition timing of the transistors 1a and 1b from a viewpoint of preventing a through-current.

The driver 2a generates a gate voltage Ga for the transistor 1a based on a first open/close control signal (output signal HG that undergoes level shifting) that is input from the drive control circuit 4 via the level shifter 3. Besides, the driver 2b generates a gate voltage Gb for the transistor 1b based on a second open/close control signal (output signal LG) that is input from the drive control circuit 4. In the meantime, an upper power supply terminal of the driver 2a is connected to the bootstrap terminal BST (application terminal for drive voltage Vbst). Besides, a lower power supply terminal of the driver 2a is connected to the switch terminal SW (application terminal for switch voltage Vsw). Accordingly, as to the gate voltage Ga given to the transistor 1a, its high level becomes the drive voltage Vbst, while its low level becomes the switch voltage Vsw. On the other hand, an upper power supply terminal of the driver 2b is connected to an application terminal for a constant voltage Vreg. Besides, a lower power supply terminal of the driver 2b is connected to the ground terminal. Accordingly, as to the gate voltage Gb given to the transistor 1b, its high level becomes the constant voltage Vreg, while its low level becomes a ground voltage.

The level shifter 3 pulls up a voltage level of the open/close control signal (output signal HG) input from the drive control circuit 4 and supplies the open/close control signal to the driver 2a. In the meantime, an upper power supply terminal of the level shifter 3 is connected to the bootstrap terminal BST (application terminal for drive voltage Vbst). Besides, a lower power supply terminal of the level shifter 3 is connected to the switch terminal SW (application terminal for switch voltage Vsw).

The drive control circuit 4 is a logic circuit that generates the open/close control signals (output signals HG and LG) for the transistors 1a and 1b based on a comparison signal CMP and an on-time setting signal ON. For example, the drive control circuit 4 sets the output signal HG from an output terminal (Q) to a high level at a rising edge of the comparison signal CMP input to a set terminal (S), and sets the output signal LG from an inverting output terminal (Q bar) to a low level. On the other hand, the drive control circuit 4 resets the output signal HG to a low level at a rising edge of the on-time setting signal ON input to a reset terminal (R), and resets the output signal LG to a low level (see third to fifth stages from top of FIG. 5).

The main comparator 5 compares the feedback voltage Vfb (divided voltage of the output voltage Vout) input into an inverting input terminal (−) and the lower one of a reference voltage RefA (detailed later) after ripple injection that is input from the ripple generation circuit 20 into a first non-inverting input terminal (+) and a soft start voltage Vss that is input from the soft start control circuit 6 into a second non-inverting input terminal (+) with each other to generate the comparison signal CMP, and outputs the comparison signal CMP to the drive control circuit 4 and the on-time setting circuit 7.

Figure 5:
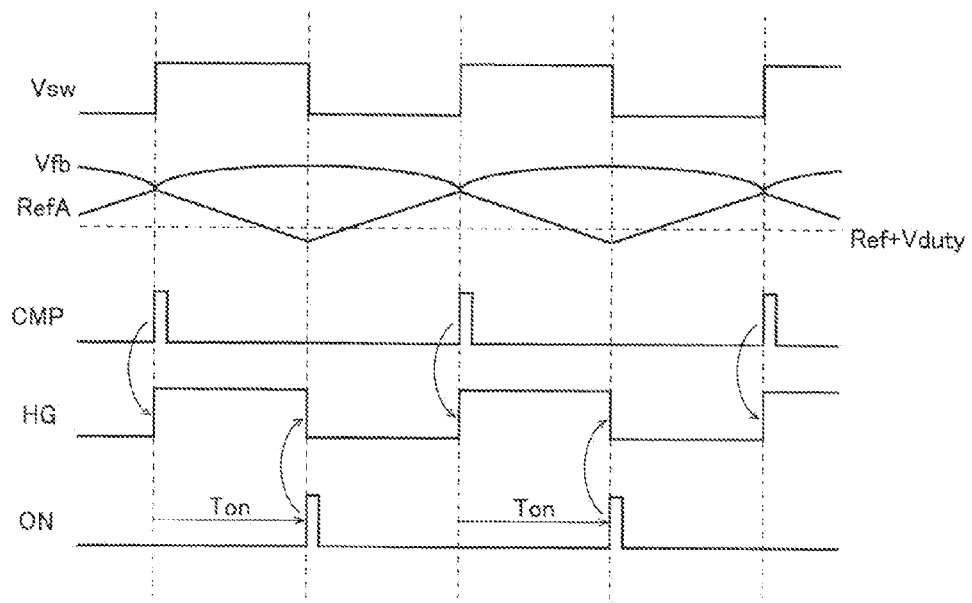
FIG. 5 is a timing chart showing an example of a switching operation.

In other words, if the feedback voltage Vfb is higher than the reference voltage RefA after ripple injection, the comparison signal CMP goes to a low level; conversely, if the feedback voltage Vfb is lower than the reference voltage RefA after ripple injection, the comparison signal CMP goes to a high level (see second and third stages from top of FIG. 5).

The soft start control circuit 6, upon a startup of the switching power supply device, starts to charge the capacitor C4 connected to the soft start terminal SS, and outputs the charged voltage as the soft start voltage Vss to the main comparator 5. During the startup time of the switching power supply device, output feedback control is performed by this soft start control such that the soft start voltage Vss rising slowly and the feedback voltage Vfb become equal to each other; therefore, it becomes possible to prevent beforehand an overshoot of the output voltage Vout and a rush current to a load and the capacitor C3.

The on-time setting circuit 7 generates a high-level trigger pulse on the on-time setting signal ON after a predetermined on-time Ton passes from the time the output signal HG from the drive control circuit 4 is raised to the high level (see fourth and fifth stages from top of FIG. 5).

In the meantime, the drivers 2a and 2b, the level shifter 3, the drive control circuit 4, the on-time setting portion 7 function as a switching control portion that performs on/off control of the transistors 1a and 1b based on the comparison signal CMP output from the main comparator 5.

The timer 8 generates a timer signal for controlling operation of the soft start control circuit 6 and outputs the timer signal to the soft start control circuit 6. Specifically, the timer 8 resets the soft start control circuit 6 to discharge the capacitor 4 when an overcurrent detection signal OCP and an overvoltage detection signal OVP are kept at a logic level indicating an unusual state over a predetermined time.

The reference voltage generation circuit 11 generates a reference voltage Vref (e.g., 4.1 V) from the input voltage Vin, and supplies the reference voltage Vref as an internal drive voltage to each portion of the switching power supply IC100.

The resistors 12a and 12b divide the reference voltage Vref to generate a desired reference voltage Ref, and applies the reference voltage Ref to the ripple generation circuit 20 (detailed later). Specifically describing a connection relationship, the resistors 12a and 12b are connected in series between an output terminal (application terminal for reference voltage Vref) of the reference voltage generation circuit 11 and the ground terminal, and a connection node between them is connected to the ripple generation circuit 20.

The constant voltage generation circuit 13 generates the predetermined constant voltage Vreg (e.g., 5 V) from the input voltage Vin.

The diode 14 is a device that is connected between an output terminal (output terminal for constant voltage Vreg) of the constant voltage generation circuit 13 and the bootstrap terminal BST and cooperates with the capacitor C2 to form the bootstrap circuit, and the drive voltage Vbst for the driver 2a and the level shifter 3 is pulled out from the cathode.

The low voltage lockout circuit 15 is an unusual-state protection means that receives supply of the reference voltage Vref to operate and shuts down the switching power supply IC100 when detecting an unusual decline in the input voltage Vin.

The thermal shutdown circuit 16 is an unusual-state protection means that receives the supply of the reference voltage Vref to operate and shuts down the switching power supply IC100 when a monitored target temperature (junction temperature of switching power supply IC100) reaches a predetermined threshold value (e.g., 175° C.).

The input bias current generation circuit 17 receives the supply of the reference voltage Vref to operate and generates an input bias current for each portion of the switching power supply IC100, for example, the ripple generation circuit 20.

The overcurrent protection circuit 18 receives supply of the input voltage Vin to operate, monitors a switch current Isw that flows during a time the output transistor 1a is in an on-state, and generates the overcurrent detection signal OCP. In the meantime, the overcurrent detection signal OCP is used to reset the drive control circuit 4 and the soft start control circuit 6.

The overvoltage protection circuit 19 monitors the feedback voltage Vfb applied to the feedback terminal FB and generates the overvoltage detection signal OVP. In the meantime, the overvoltage detection signal OVP is used to reset the soft start control circuit 6.

The ripple generation circuit 20 uses the output signal HG from the drive control circuit 4 to generate a ripple component, and injects the ripple component into the reference voltage Ref to generate the reference voltage RefA after ripple injection (see second stage from top of FIG. 5).

<Ripple Generation Circuit (First Structural Example)>

Figure 2:
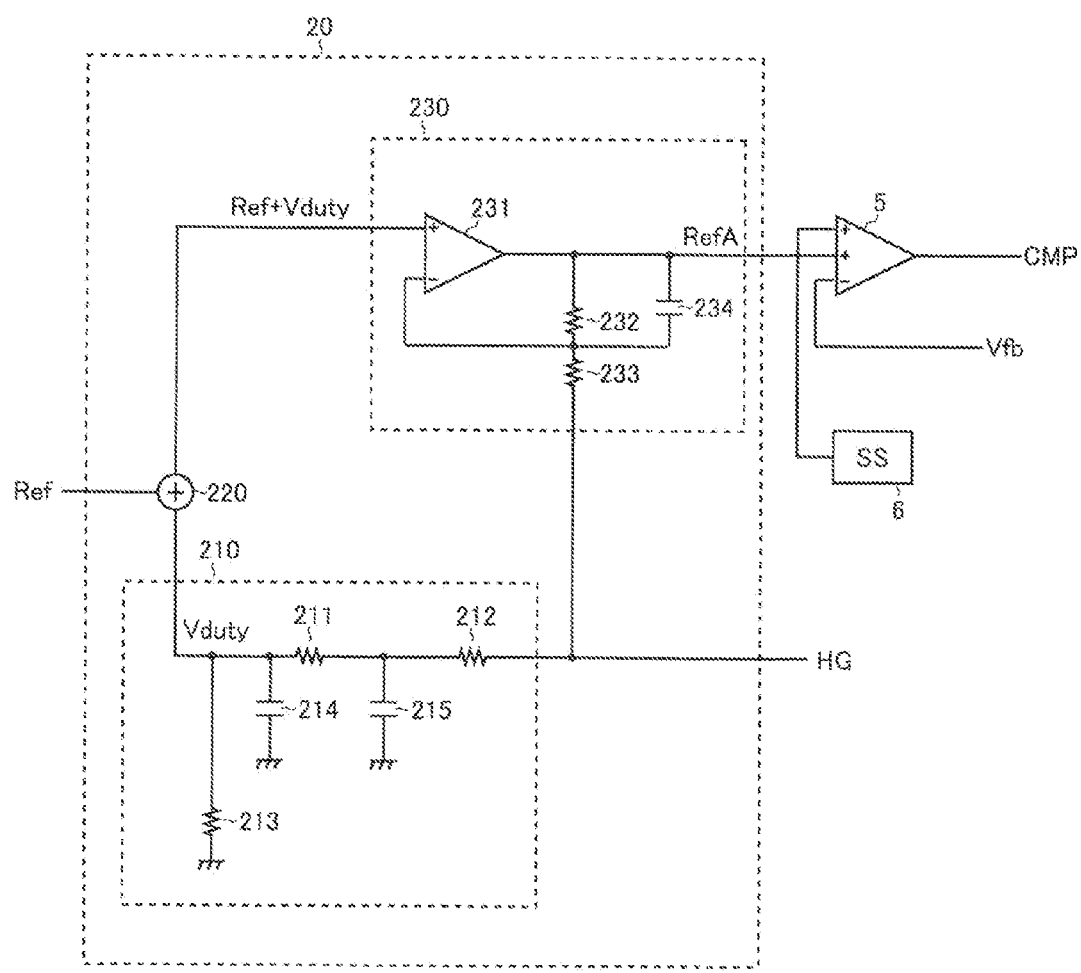
FIG. 2 is a circuit diagram showing a first structural example of a ripple generation circuit 20.

Next, details of the ripple generation circuit 20 are described. FIG. 2 is a circuit diagram that shows a first structural example of the ripple generation circuit 20. The ripple generation circuit 20 according to the first structural example has: a correction voltage generation portion 210; an addition portion 220; and a ripple injection portion 230.

The correction voltage generation portion 210 smooths the output signal HG from the drive control circuit 4 by means of one stage of CR filter or a plurality of stages of CR filters to generate a correction voltage Vduty, and outputs the correction voltage Vduty to the addition portion 220.

The addition portion 220 pulls up the reference voltage Ref before ripple injection in accordance with the correction voltage Vduty to generate a reference voltage (Ref+Vduty) after correction, and outputs the reference voltage (Ref+Vduty) to the ripple injection portion 230.

The ripple injection portion 230 uses the output signal HG to inject a ripple component into the reference voltage (Ref+Vduty) after correction.

Next, components and connection form of each circuit are described.

The correction voltage generation portion 210 has: resistors 211 to 213; a capacitor 214; and a capacitor 215.

A first terminal of the resistor 211 is connected to a first input terminal of the addition portion 220. A second terminal of the resistor 211 is connected to a first terminal of the resistor 212. A second terminal of the resistor 212 is connected to an input terminal for the output signal HG. A first terminal of the resistor 213 is connected to a connection node between the addition portion 220 and the resistor 211. A second terminal of the resistor 213 is connected to the ground terminal.

A first terminal of the capacitor 214 is connected to the connection node between the addition portion 220 and the resistor 211. A second terminal of the capacitor 214 is connected to the ground terminal A first terminal of the capacitor 215 is connected to a connection node between the resistor 212 and the resistor 212. A second terminal of the capacitor 215 is connected to the ground terminal.

Figure 3:
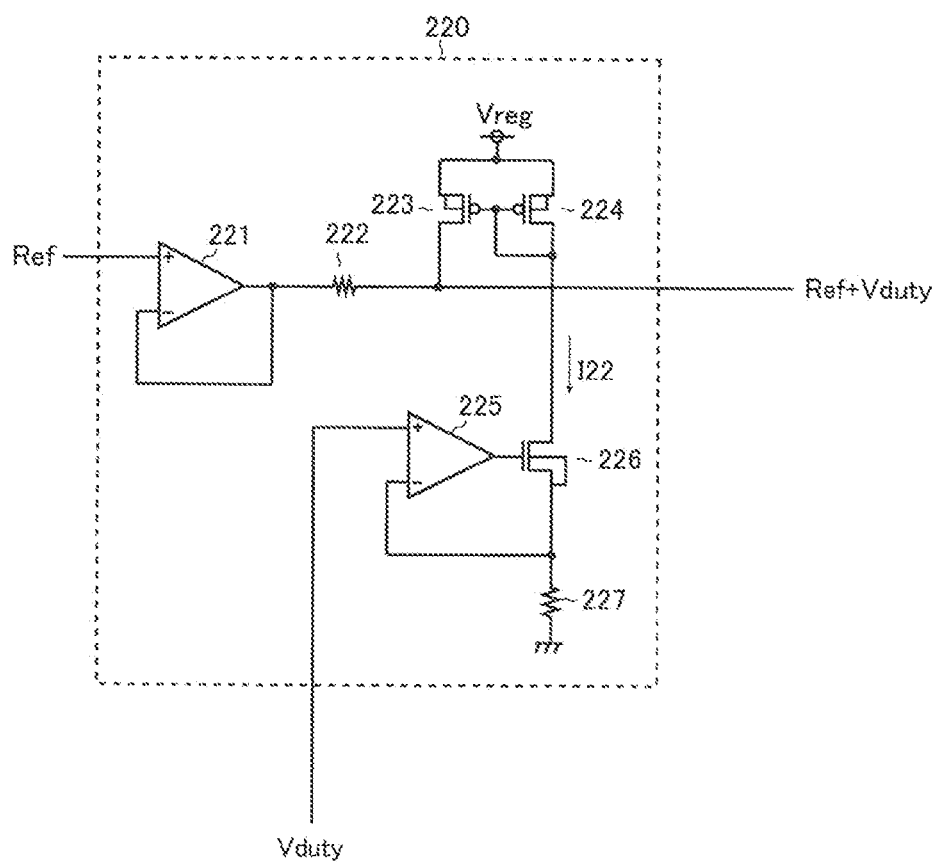
FIG. 3 is a circuit diagram showing a structural example of an addition portion 220.

Next, components and connection form of the addition portion 220 are described using FIG. 3. FIG. 3 is a circuit diagram that shows a structural example of the addition portion 220. As shown in FIG. 3, the addition portion 220 according to the present structural example has: an operational amplifier 221; a resistor 222; P channel type MOS field effect transistors 223 and 224; an operational amplifier 225; an N channel type MOS field effect transistor 226; and a resistor 227.

A non-inverting input terminal (+) of the operational amplifier 221 is connected to an application terminal for the reference voltage Ref. An output terminal of the operational amplifier 221 is connected to a first terminal of the resistor 222. An inverting input terminal (−) of the operational amplifier 221 is connected to a connection node between its output terminal and the resistor 222. In other words, the operational amplifier 221 functions as a buffer.

A second terminal of the resistor 222 is connected to an output terminal of the addition portion 220. A drain of the transistor 223 is connected to a connection node between the second terminal of the resistor 222 and the output terminal of the addition portion 220. A source of the transistor 223 is connected to the application terminal for the constant voltage Vreg and a source of the transistor 224. A gate of the transistor 223 is connected to a gate and a drain of the transistor 224. The source of the transistor 224 is connected to the application terminal for the constant voltage Vreg. The drain of the transistor 224 is connected to a drain of the transistor 226.

A non-inverting input terminal (+) of the operational amplifier 225 is connected to an application terminal for the correction voltage Vduty. An output terminal of the operational amplifier 225 is connected to a gate of the transistor 226. An inverting input terminal (−) of the operational amplifier 225 is connected to a connection node between a source of the transistor 226 and a first terminal of the resistor 227. A second terminal of the resistor 227 is connected to the ground terminal.

Next, components and connection form of the ripple injection portion 230 are described using FIG. 2. The ripple injection portion 230 has: an operational amplifier 231 (ripple amplifier); a resistor 232; a resistor 233; and a capacitor 234.

A non-inverting input terminal (+) of the operational amplifier 231 is connected to the output terminal (which corresponds to an application terminal for the reference voltage Ref+Vduty) of the addition portion 220. An inverting input terminal (−) of the operational amplifier 231 is connected to a connection node between the resistor 232 and the resistor 233. An output terminal of the operational amplifier 231 is connected to a non-inverting input terminal (+) of the main comparator 5.

A first terminal of the resistor 232 is connected to a connection node between the operational amplifier 231 and the main comparator 5. A second terminal of the resistor 232 is connected to a first terminal of the resistor 233. A second terminal of the resistor 233 is connected to the input terminal for the output signal HG. A first terminal of the capacitor 234 is connected to a connection node between the operational amplifier 231 and the main comparator 5. A second terminal of the capacitor 234 is connected to a connection node between the resistor 232 and the resistor 233.

Next, operation of the ripple generation circuit 20 is described.

The resistor 211, the resistor 212, the capacitor 214 and the capacitor 215, which are included in the correction voltage generation 210, form a two-stage CR filter, and function as a smoothing circuit that smooths the output signal HG output from the drive control circuit 4 to generate the desired correction voltage Vduty. In the meantime, in the present structural example, the CR filter has the two-stage structure; but it is possible to suitably modify the number of stages in accordance with design requirements.

The resistor 213 cooperates with the resistors included in the CR filter to form a voltage division circuit. In the meantime, in the present structural example, as shown in FIG. 2, the voltage division circuit is formed by connecting the resistor 213 to the first terminal of the resistor 211; but another connection form may be employed to form the voltage division circuit. For example, a connection form may be employed, in which the voltage division circuit is formed by connecting the first terminal of the resistor 213 to a connection node between the input terminal for the output signal HG and the resistor 212.

The operational amplifier 225, the transistor 226, and the resistor 227, which are included in the addition portion 220, form a voltage/current conversion circuit for the correction voltage Vduty. According to this, an added current I22 is generated in accordance with a magnitude of the correction voltage Vduty. Besides, the transistor 223 and the transistor 224 function as a current mirror circuit for producing the added current I22. In other words, the voltage/current conversion circuit and the current mirror circuit cooperate with each other to form an added current generation circuit. According to this, the added current I22 flows from the transistor 223 to the output terminal of the operational amplifier 221 via the resistor 222; therefore, a voltage difference occurs across both terminals of the resistor 222 in accordance with a magnitude of the added current I22. As a result of this, the reference voltage (Ref+Vduty) after correction reflecting the correction voltage Vduty is generated and output to the ripple injection portion 230.

The resistor 232, the resistor 233 and the capacitor 234, which are included in the ripple injection portion 230, function as a pulse drive portion that applies pulse driving to a negative feedback loop of the operational amplifier 231 in accordance with the output signal HG. By employing such structure, the reference voltage RefA after ripple injection output from the operational amplifier 231 has a waveform whose voltage value changes with respect to the reference voltage (Ref+Vduty) after correction, that is, a waveform in which a ripple component is injected in the reference voltage (Ref+Vduty) after correction (see second stage from top of FIG. 5).

In the meantime, the resistance values of the resistors included in the above correction voltage generation portion 210 are decided in accordance with design requirements based on a change range of the feedback voltage Vfb to be cancelled by the correction voltage Vduty. For example, the decision is performed by a method that uses a formula described below.

In the structure shown in FIG. 2 and FIG. 3, the feedback voltage Vfb is expressed by the following formula. In the meantime, hereinafter, the resistance value of the resistor 232 is expressed as R1, the resistance value of the resistor 233 is expressed as R2, the resultant resistance value of the resistors 211 and 212 is expressed as R3, the resistance value of the resistor 213 is expressed as R4, the resistance value of the resistor 222 is expressed as R7, and the resistance value of the resistor 227 is expressed as R9. Besides, the on-duty of the output signal HG is expressed as Don.

First, in a case where the output signal HG is in an on-state, RefA (hereinafter, called "RefAon") is expressed by the following formula (1).

$$RefAon = \frac{R1+R2}{R2} \times Ref - \frac{R1}{R2} \times Vreg \tag{1}$$

Besides, in a case where the output signal HG is in an off-state, RefA (hereinafter, called "RefAoff") is expressed by the following formula (2).

$$RefAoff = \frac{R1+R2}{R2} \times Ref \tag{2}$$

The feedback voltage Vfb is a sum of a term obtained by multiplying RefAon by the on-duty Don and a term obtained by multiplying RefAoff by the off-duty Doff (=1−Don); therefore, the feedback voltage Vfb is expressed by the following formula (3).

$$Vfb = Don \times RefAon + (1-Don) \times RefAoff \tag{3}$$

By substituting RefAon and RefAoff for the above formula (3) and making arrangement, Vfb is expressed as the following formula (4a). Besides, a deviation amount Vfb_err (=Vfb−Ref) between the feedback voltage Vfb and the reference voltage Ref is expressed as the following formula (4b).

$$Vfb = \frac{R1+R2}{R2} \times Ref - \frac{R1}{R2} \times Vreg \times Don \tag{4a}$$

$$Vfb\_err = Vfb - Ref = \frac{R1}{R2}(Ref - Vreg \times Don) \tag{4b}$$

As indicated by the formula (4b), the deviation amount Vfb_err between the feedback voltage Vfb and the reference voltage Ref includes (Vreg×Don) in the second term on the right side and is influenced by Don to change.

Because of this, in the present invention, the reference voltage Ref included in the first term on the right side is replaced with the reference voltage (Ref+Vduty) after correction to which the correction voltage Vduty is added. The reference voltage (Ref+Vduty) after correction is expressed as the following formula (5).

$$Ref + Vduty = Ref + \frac{R7}{R9} \times \frac{R4}{R3+R4} \times Vreg \times Don \tag{5}$$

As described above, also, the reference voltage (Ref+Vduty) after correction is influenced by Don to change; therefore, it is possible to increase or decrease the first term on the right side in accordance with increase or decrease in the second term on the right side of the formula (4b). In this way, it is possible to cancel the influence of the on-duty Don. In the meantime, the voltage value to be cancelled changes in accordance with Vreg included in the second term on the right side; therefore, the circuit constant (e.g., resistance value of resistor 213) of the correction voltage generation portion 210 may be set in accordance with this Vreg. In this way, it becomes possible to set the peak value of RefA at a desired target value.

An example of a function and effect obtained from the structure of the present invention mentioned above is described.

Figure 6:
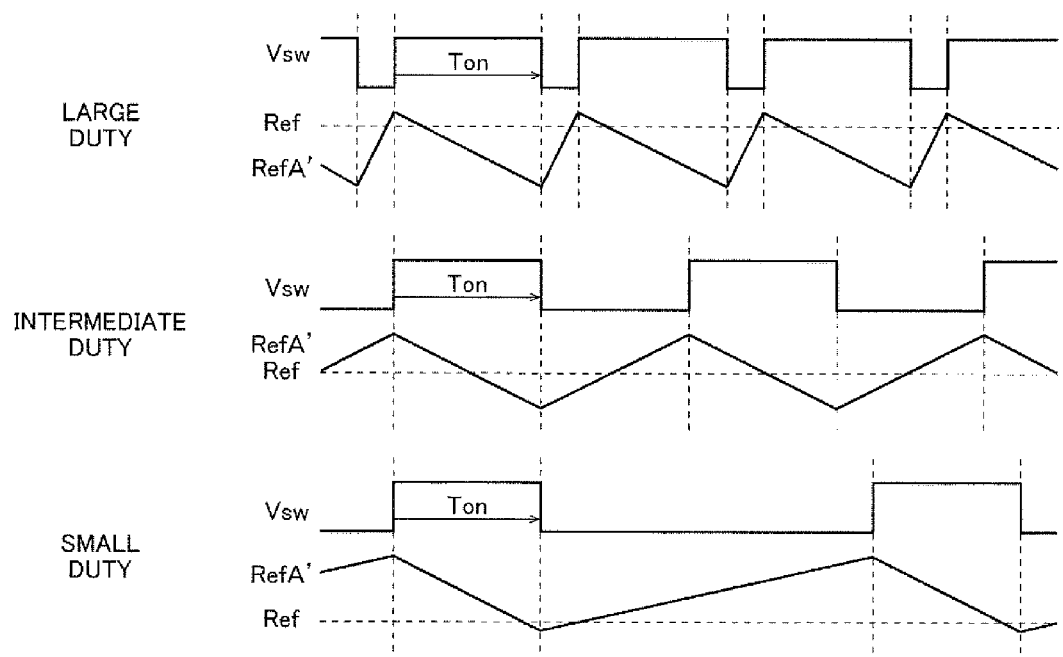
FIG. 6 is a waveform view showing duty dependency of a reference voltage RefA'.

FIG. 6 is a waveform view that shows a reference voltage RefA' (especially, its duty dependency) after ripple injection generated by injecting a ripple into the reference voltage Ref to which the correction voltage Vduty is not added in the conventional switching power supply device. As show in this figure, a DC value of the reference voltage RefA' changes in accordance with a duty of the switch voltage Vsw. More specifically, the larger the duty is, the lower the DC value of the reference voltage RefA' becomes, while the smaller the duty is, the higher the DC value of the reference voltage RefA' becomes.

Figure 9:
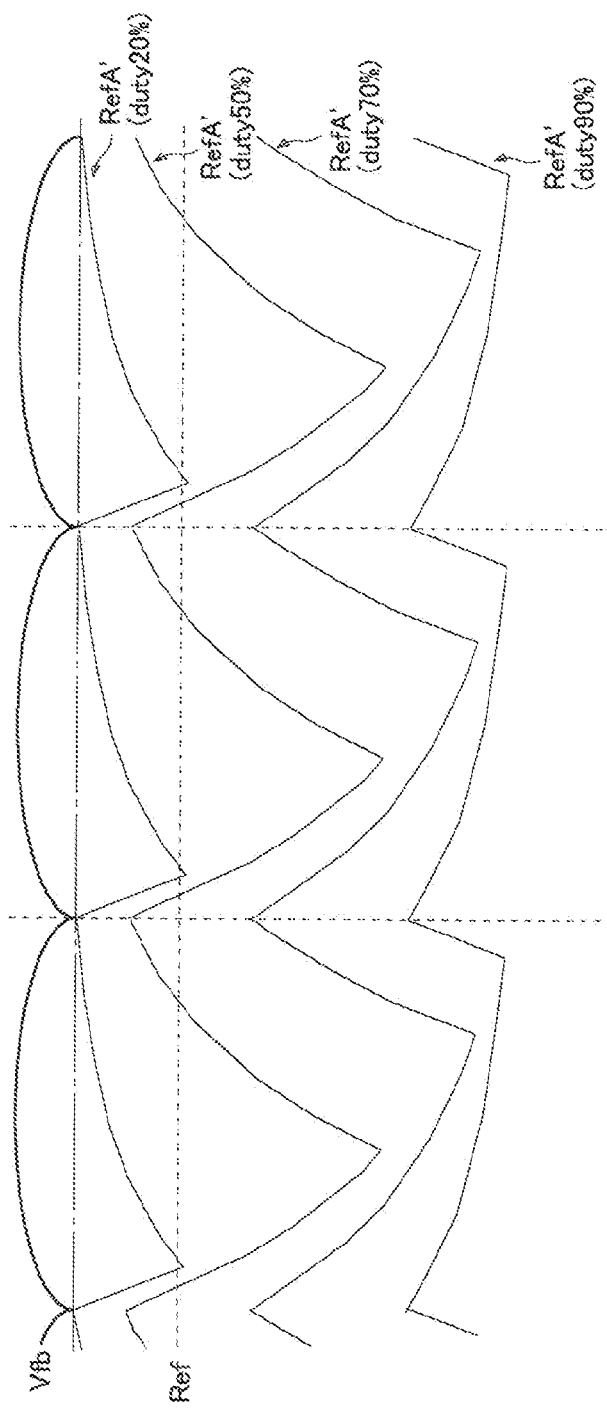
FIG. 9 is a waveform view showing a reference voltage after ripple injection to which a correction voltage is not added.
Figure 10:
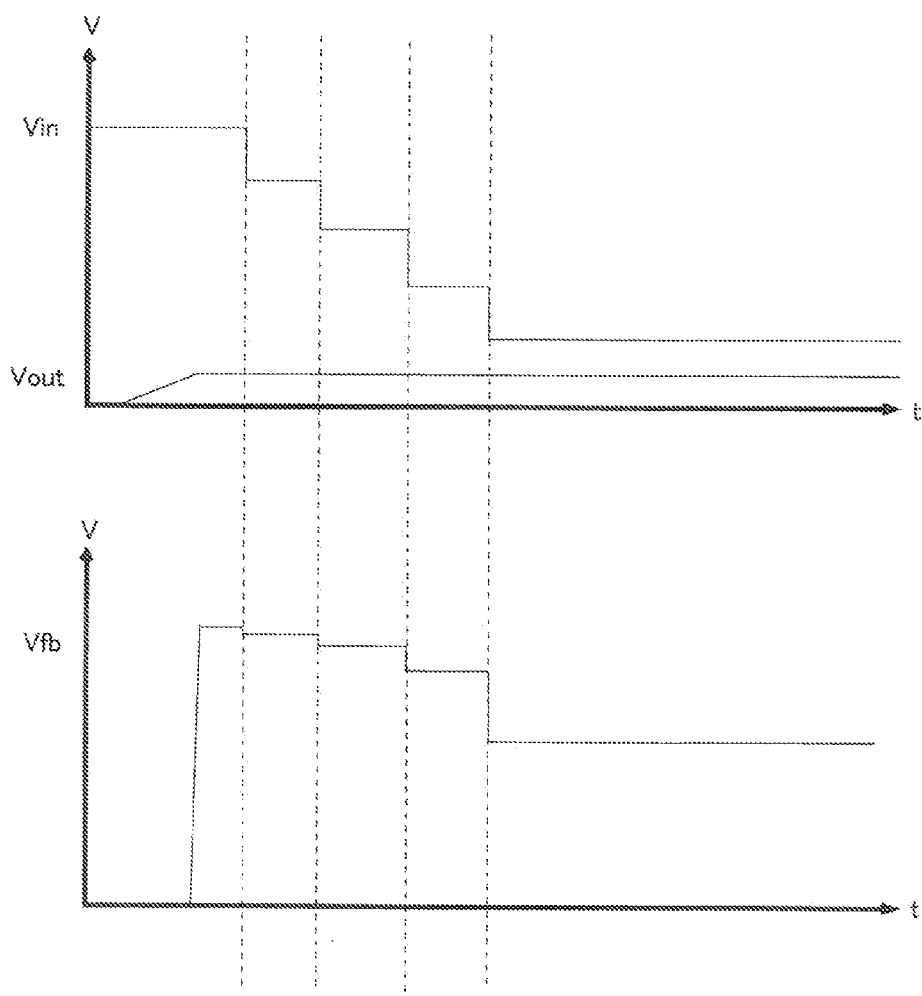
FIG. 10 is a schematic view showing a conventional relationship between an input/output voltage and a feedback voltage.

FIG. 9 is a schematic view that compares DC values of the reference voltage RefA' after ripple injection with one another for respective duties of the switch voltage Vsw in the conventional switching power supply device. FIG. 10 is a schematic view that shows a relationship among the input voltage Vin, the output voltage Vout, and the feedback voltage Vfb in the conventional switching power supply device. In the meantime, in FIG. 10, the vertical axis indicates the voltage, and the horizontal axis indicates the time passage.

As shown in FIG. 9 and FIG. 10, in the conventional switching power supply device, if the duty changes because of a change in the input voltage Vin, because of this influence, the DC value of the reference voltage RefA' after ripple injection changes; as a result of this, the feedback voltage Vfb changes. Therefore, there is a problem that a deviation occurs in the reference voltage Vfb and line regulation deteriorates.

Figure 7:
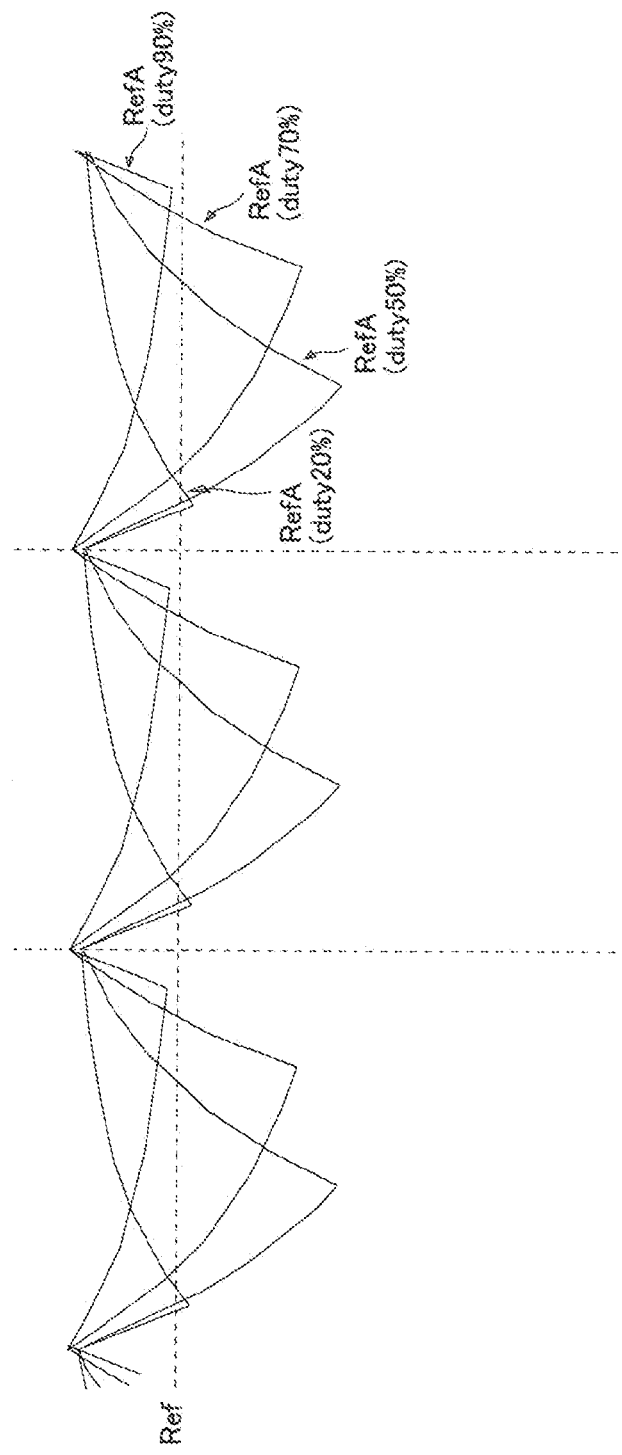
FIG. 7 is a waveform view showing a reference voltage after ripple injection to which a correction voltage is added.
Figure 8:
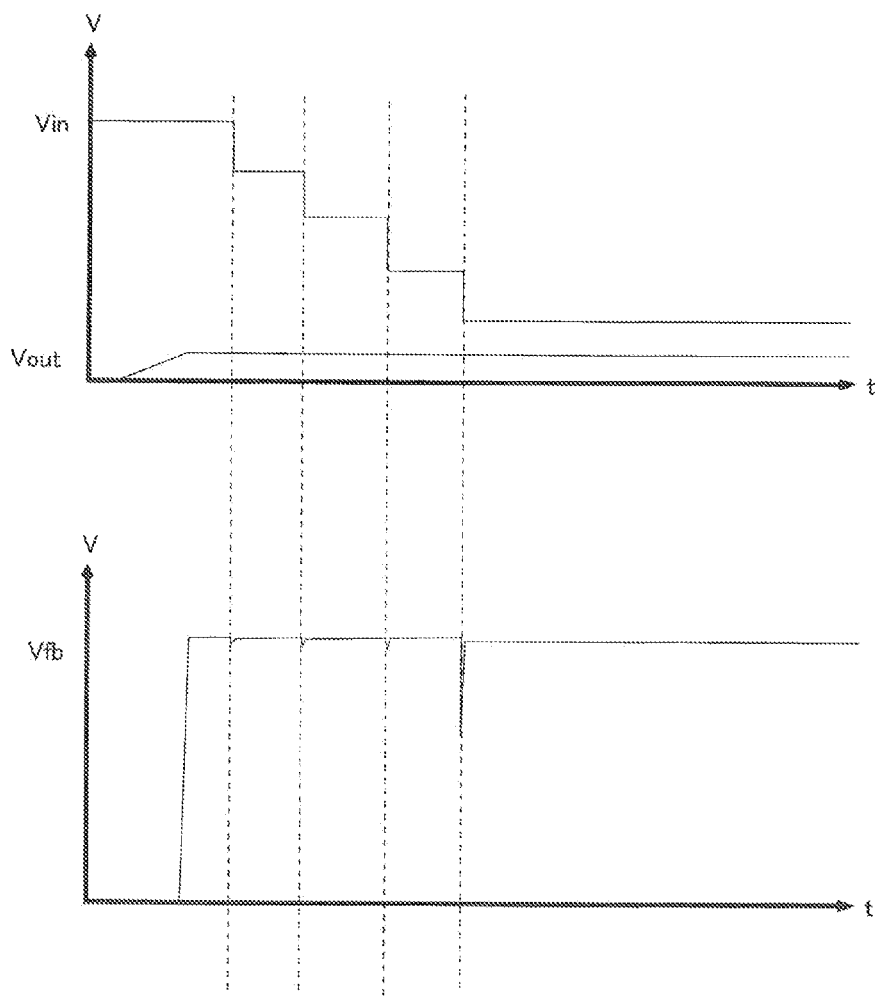
FIG. 8 is a schematic view showing a relationship between an input/output voltage and a feedback voltage in the present invention.

In contrast to this, according to the structure of the present invention, by adding the correction voltage Vduty in accordance with the duty to the reference voltage Ref, it is possible to correct the deviation. FIG. 7 is a schematic view that compares DC values of the reference voltage RefA after ripple injection with one another for respective duties of the switch voltage Vsw in the switching power supply device according to the present invention. Besides, FIG. 8 is a schematic view that shows a relationship among the input voltage Vin, the output voltage Vout, and the feedback voltage Vfb in the switching power supply device according to the present invention.

As shown in FIG. 7, the peak value of the reference voltage RefA after ripple injection generated by means of the reference voltage (Ref+Vduty) after correction has the substantially same value for any duty. Because of this, as shown in FIG. 8, a deviation does not occur in the feedback voltage Vfb, and it is possible to keep the feedback voltage Vfb substantially constant. In this way, it is possible to improve the line regulation.

<Ripple Generation Circuit (Second Structural Example)>

Figure 4:
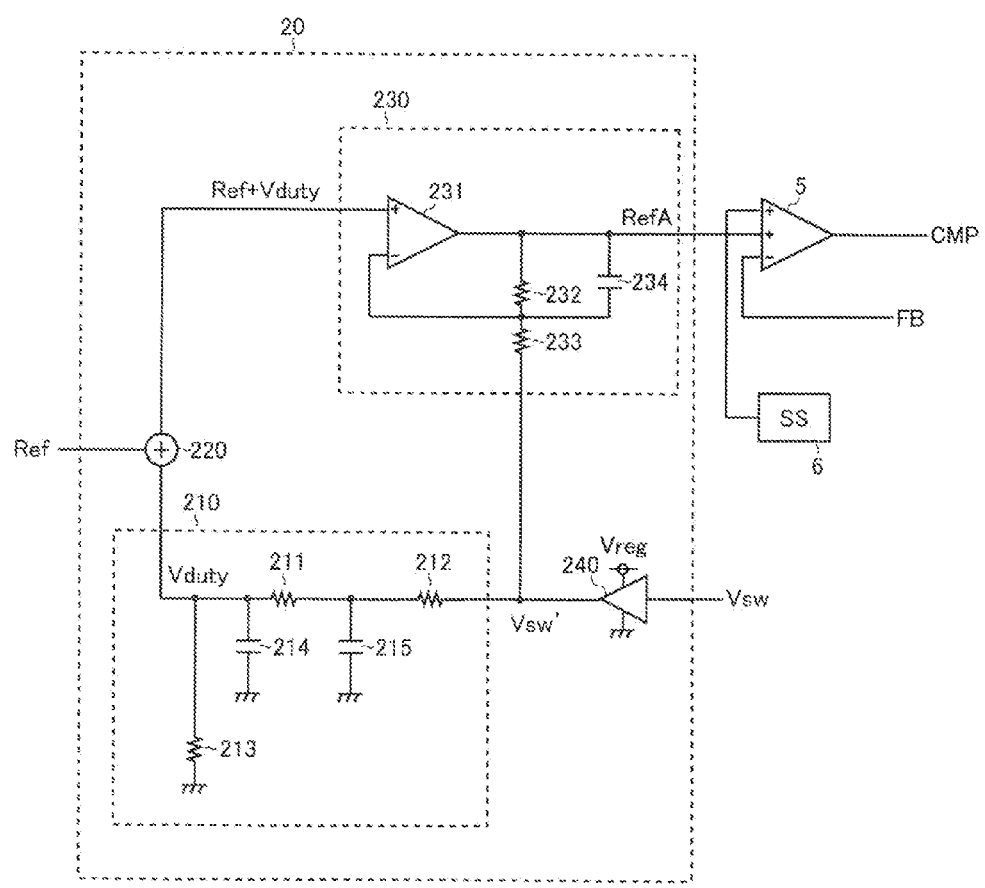
FIG. 4 is a circuit diagram showing a second structural example of the ripple generation circuit 20.

FIG. 4 is a circuit block diagram that shows a second structural example of the ripple generation circuit 20. The second structural example has basically the same structure as the above first structural example, but is characterized in that the output signal HG is not used but the switch voltage Vsw is used to generate the correction voltage Vduty. Accordingly, the same components as in the first structural example are indicated by the same reference numbers as in FIG. 2 to skip double description, and hereinafter, description is performed focusing on characteristic portions of the second structural example.

The ripple generation circuit 20 according to the second structural example has a buffer 240 besides the correction voltage generation portion 210, the addition portion 220, and the ripple injection portion 230 that are described above.

An input terminal of the buffer 240 is connected to the application terminal for the switch voltage Vsw. An output terminal of the buffer 240 is connected to the second terminal of the resistor 212 and the second terminal of the resistor 233.

An upper power supply terminal of the buffer 240 is connected to the application terminal for the constant voltage Vreg. A lower power supply terminal of the buffer 240 is connected to the ground terminal According to this, as to a pulse voltage Vsw' output from the buffer 240, its high level becomes the constant voltage Vreg, while its low level becomes the ground voltage. As described above, the buffer 240 generates the pulse voltage Vsw', which has a constant crest value of the switch voltage Vsw, and outputs it to a subsequent stage.

By employing such structure, it becomes possible to obtain the same function and effect as the above first structural example. Besides, of a timing when a waveform of the output signal HG changes and a timing when a waveform of the switch voltage Vsw changes, the latter is more approximate to an actual switching timing. This is because a time lag occurs between the timing when the waveform of the output signal HG changes and the actual switching timing because of an influence of a time required for switching operation of the MOS field effect transistor. Because of this, according to the second structural example, compared with the above first structural example, it becomes possible to obtain a function and effect of generating the correction voltage Vduty based on duty information that is more highly accurate.

<Ripple Generation Circuit (Third Structural Example)>

In the meantime, in the first structural example (FIG. 2) and the second structural example (FIG. 4) that are described above, the amplitude (hereinafter, called a "ripple amplitude") of a ripple voltage injected into the reference voltage Ref changes in accordance with the duty of the switch voltage Vsw. More specifically, the ripple amplitude becomes maximum at a 50% duty, and the ripple amplitude decreases as the duty approaches 0% or 100%. Therefore, there is a problem that also the output voltage Vout generated in accordance with the reference voltage RefA after ripple injection changes in accordance with the duty of the switch voltage Vsw.

Figure 11:
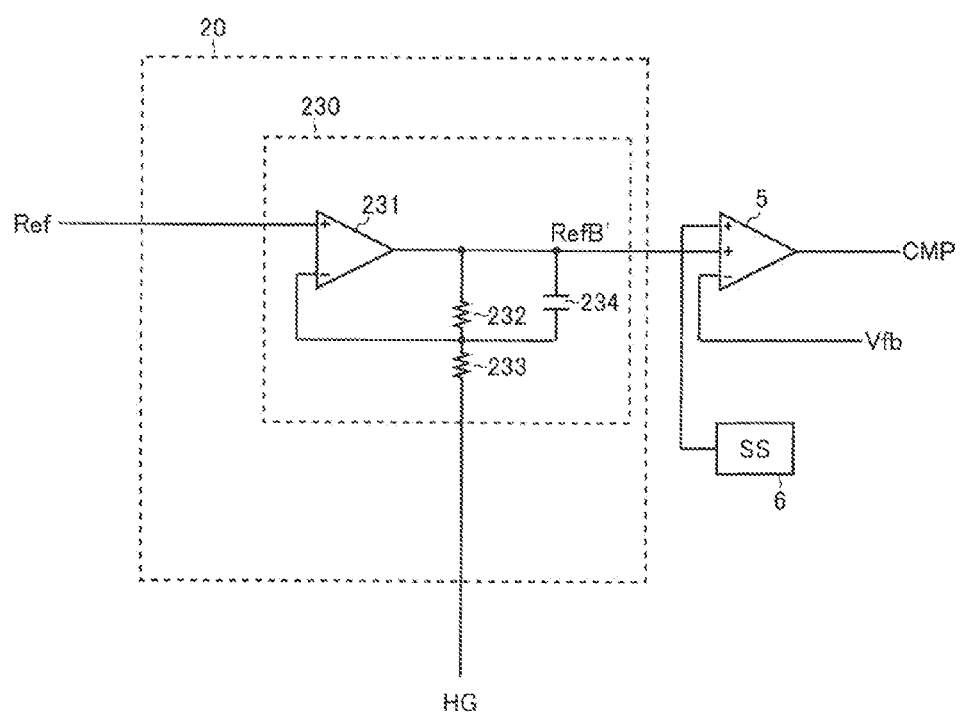
FIG. 11 is a circuit diagram showing a conventional ripple generation circuit.
Figure 12:
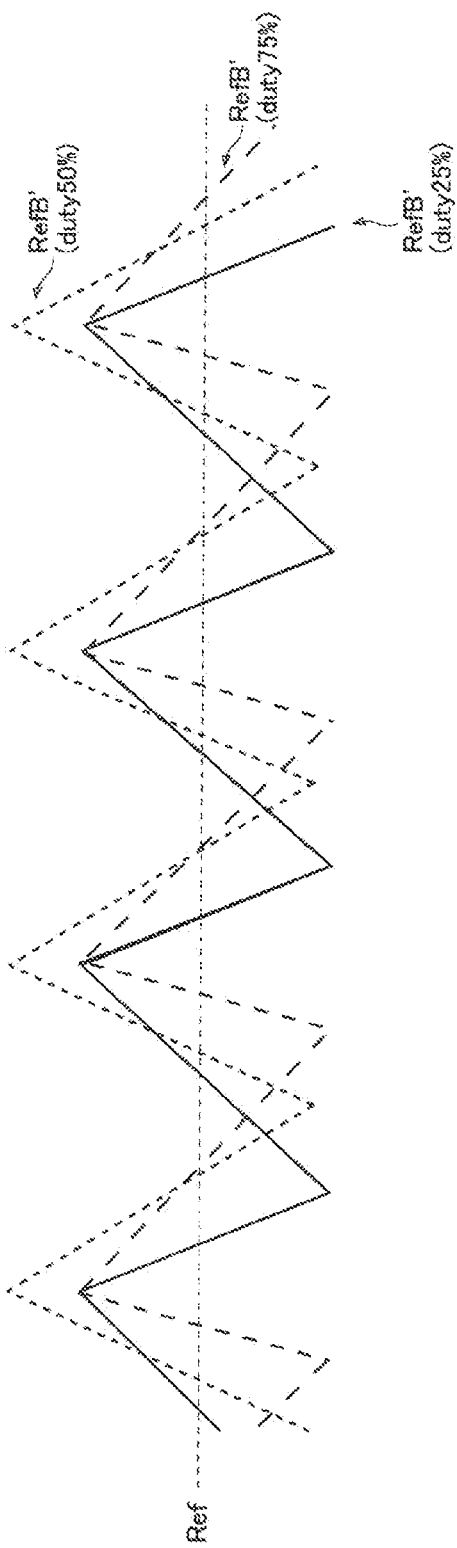
FIG. 12 is a waveform view showing a conventional relationship between a reference voltage and a reference voltage after ripple injection.
Figure 13:
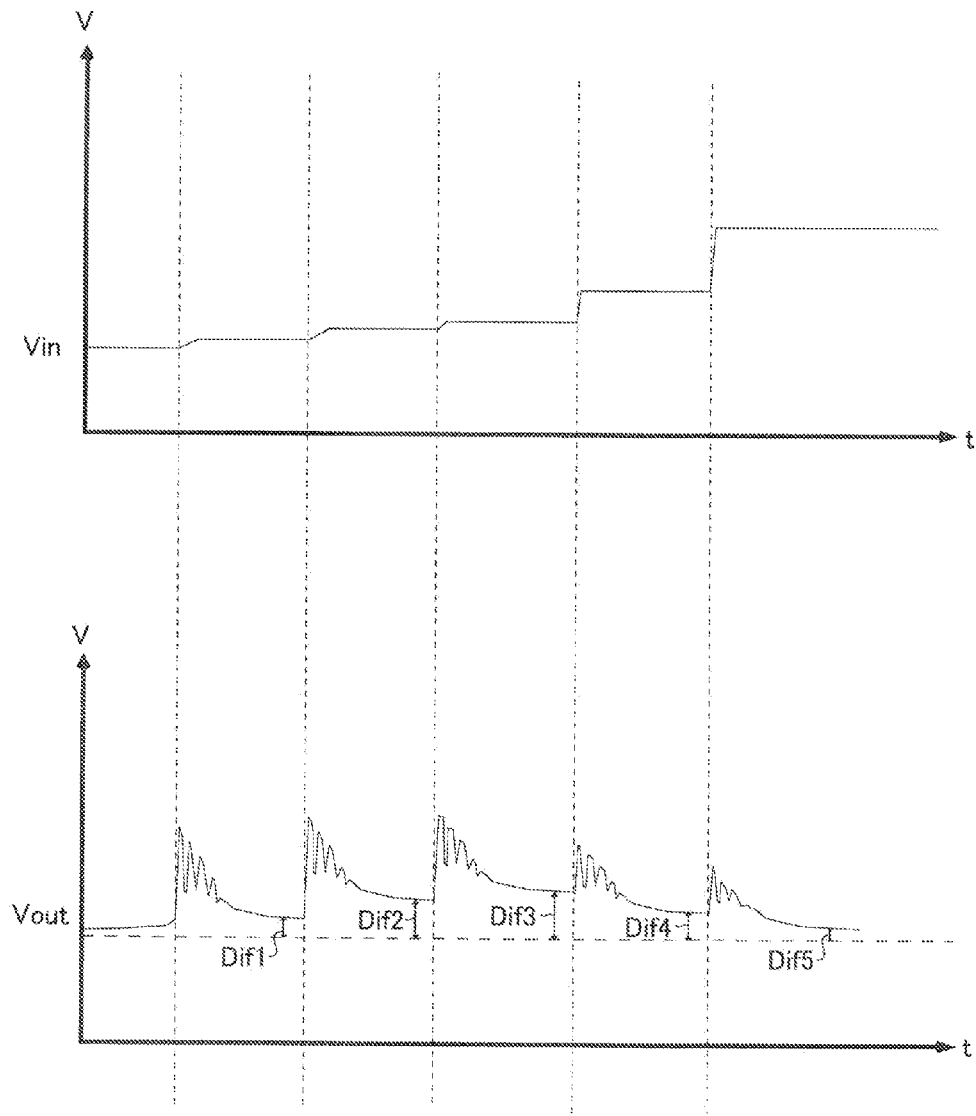
FIG. 13 is a schematic view showing a conventional input voltage and a conventional output voltage.
Figure 14:
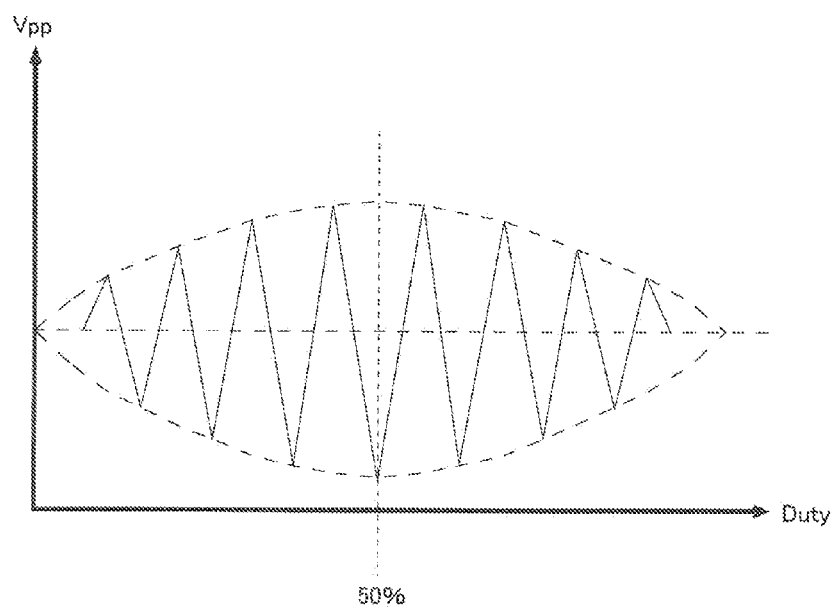
FIG. 14 is a schematic view showing a relationship between an amplitude and duty of a ripple voltage.

The above problem is described using FIG. 11 to FIG. 14. FIG. 11 is a circuit diagram that shows a structure (which corresponds to the conventional structure) of the ripple generation circuit 20 that uses the ripple injection portion 230 only. FIG. 12 is a waveform view that shows a relationship between the reference voltage Ref and a reference voltage RefB' after ripple injection. FIG. 13 is a schematic view that shows the input voltage Vin and output voltage Vout of the switching power supply IC100 that has the ripple generation circuit 20 in FIG. 11. FIG. 14 is a schematic view that shows a relationship between the duty and ripple amplitude of the switch voltage Vsw.

The ripple generation circuit 20 in FIG. 11 is structured to have the ripple injection portion 230 only of the components described in the first structural example (FIG. 2). In the meantime, details of the ripple injection portion 230 are the same as the first structural example; accordingly, description is skipped here.

The amplitude of a ripple voltage generated by the ripple generation circuit 20 having the above structure is expressed by the following formula (6). In the meantime, in the formula (6), the ripple amplitude is expressed as Vpp, the resistance value of the resistor 233 is expressed as R2, the high level voltage of the output signal HG is expressed as Vreg, the capacitance of the capacitor 234 is expressed as C1, the drive frequency of the output signal HG is expressed as F, the on-duty of the output signal HG is expressed as Don, and the off-duty of the output signal HG is expressed as Doff $$Vpp = \frac{Vreg \times Don \times Doff}{R2 \times C1 \times F} \quad (6)$$

In the above formula (6), a portion of Vreg/(R2×C1×F) becomes a constant; therefore, when this is expressed as a constant α, Vpp is expressed by the following formula (7).

$$Vpp = \alpha \times Don \times Doff \quad (7)$$

As described above, the ripple amplitude Vpp changes in accordance with a multiplied value of the on-duty Don and the off-duty Doff FIG. 12 is a schematic view that shows three patterns of voltage waveforms, for different duties, of the reference voltage RefB' after ripple injection generated by the ripple generation circuit 20 in FIG. 11. In the meantime, in FIG. 12, a solid line indicates a voltage waveform at a 25% on-duty, a small broken line indicates a voltage waveform at a 50% on-duty, and a large broken line indicates a voltage waveform at a 75% on-duty. As shown in FIG. 12, the peak value of the reference voltage RefB' is uneven. This unevenness has an influence on the output voltage Vout.

FIG. 13 is a schematic view that shows a relationship between the input voltage Vin and output voltage Vout of the switching power supply IC100 that has the ripple generation circuit 20 in FIG. 11. In the meantime, the horizontal axis of FIG. 13 indicates the time passage. Besides, Dif1 to Dif5 in FIG. 13 indicate differences between predetermined voltages and the output voltage Vout in a substantially steady state.

As shown in FIG. 13, when the input voltage Vin rises as time passes and the duty of the output signal HG changes, the reference voltage RefB' after ripple injection changes; therefore, unevenness occurs in Dif1 to Dif5.

FIG. 14 is a view that schematically shows a change in the ripple amplitude which is a cause of the above unevenness. The vertical axis of FIG. 14 indicates the ripple amplitude Vpp, while the horizontal axis indicates the duty of the output signal HG.

For example, in a case of a 50% duty, the multiplied value of the on-duty Don and the off-duty Doff becomes 0.5×0.5=0.25. Besides, in a case of a 10% duty, the multiplied value of the on-duty Don and the off-duty Doff becomes 0.1×0.9=0.09. Therefore, in light of the formula (7), the ripple amplitude Vpp becomes maximum at the 50% duty and decreases as the duty goes away from 50%.

Accordingly, in light of the above problem, the ripple generation circuit 20 according to a third structural example next described aims to reduce the change in the output voltage Vout by cancelling a change in the ripple amplitude Vpp due to the duty change.

Figure 15:
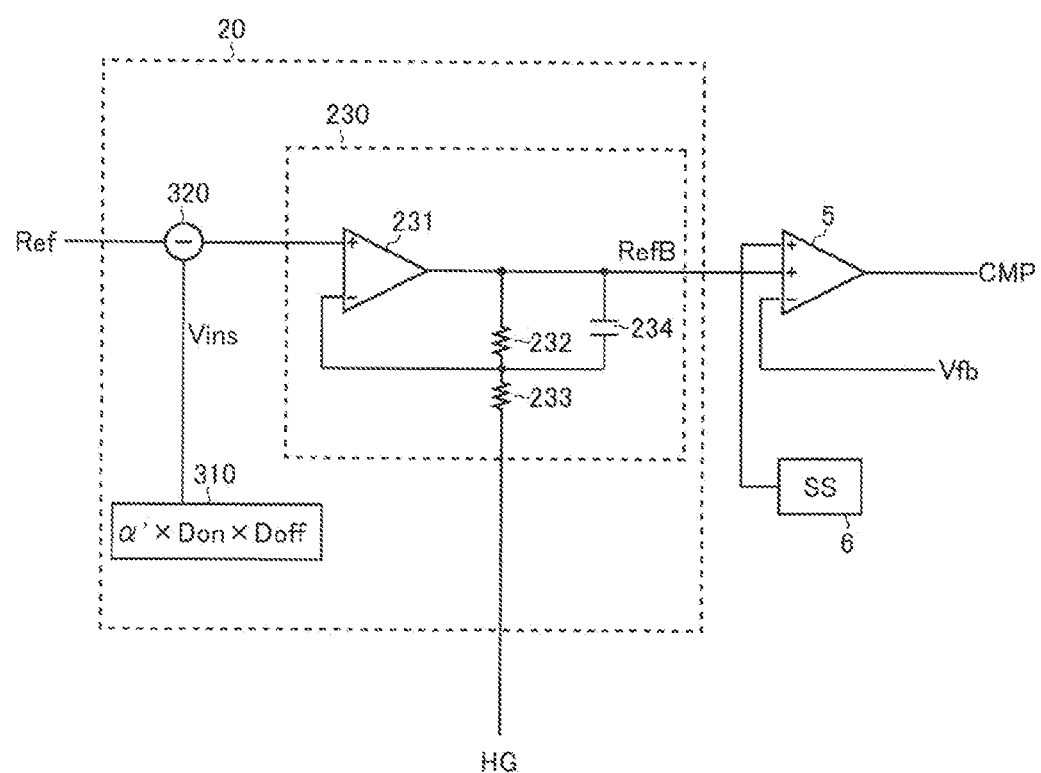
FIG. 15 is a block diagram showing a third structural example of the ripple generation circuit.
Figure 16:
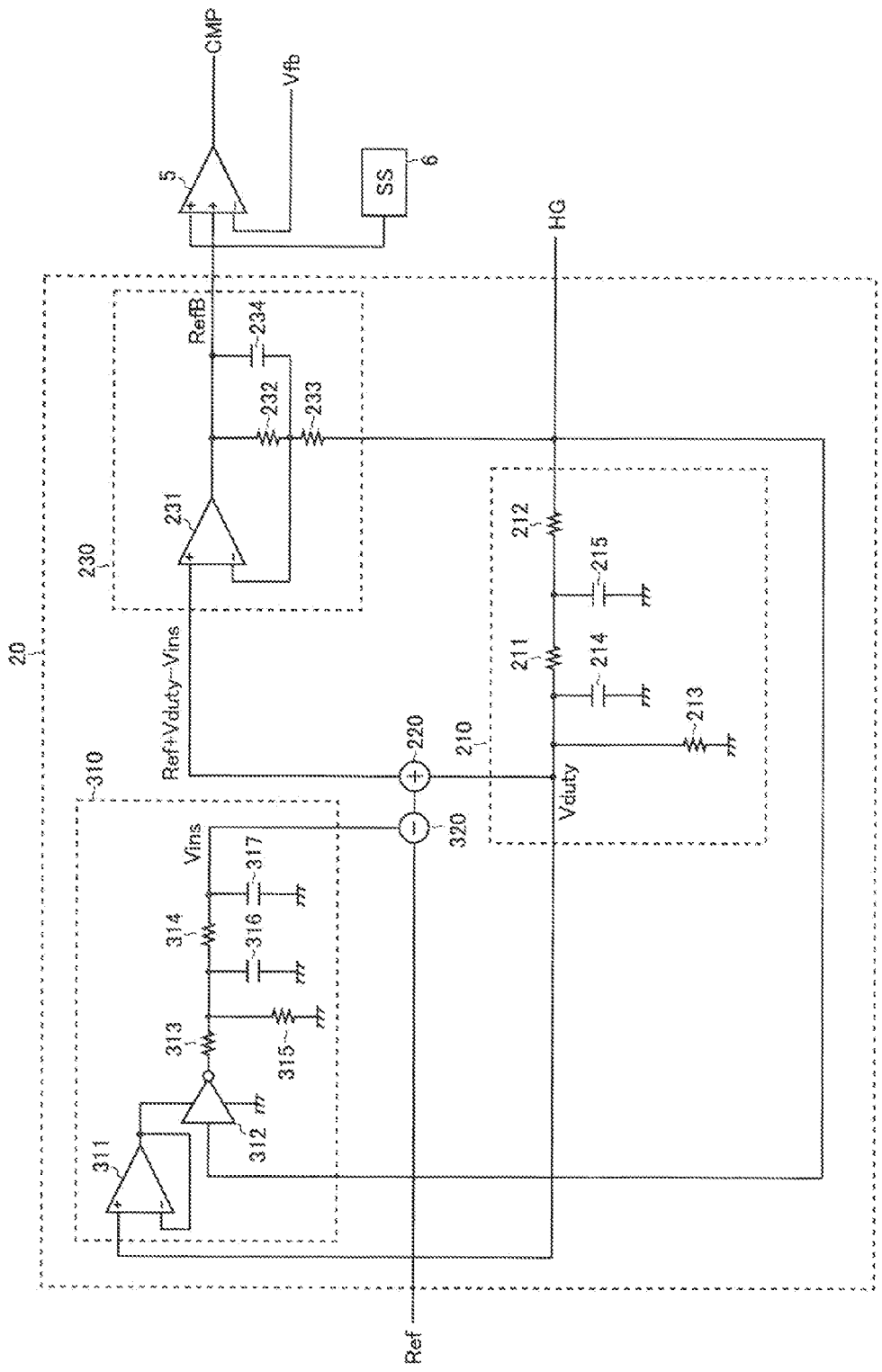
FIG. 16 is a circuit diagram showing a third structural example of the ripple generation circuit.
Figure 17:
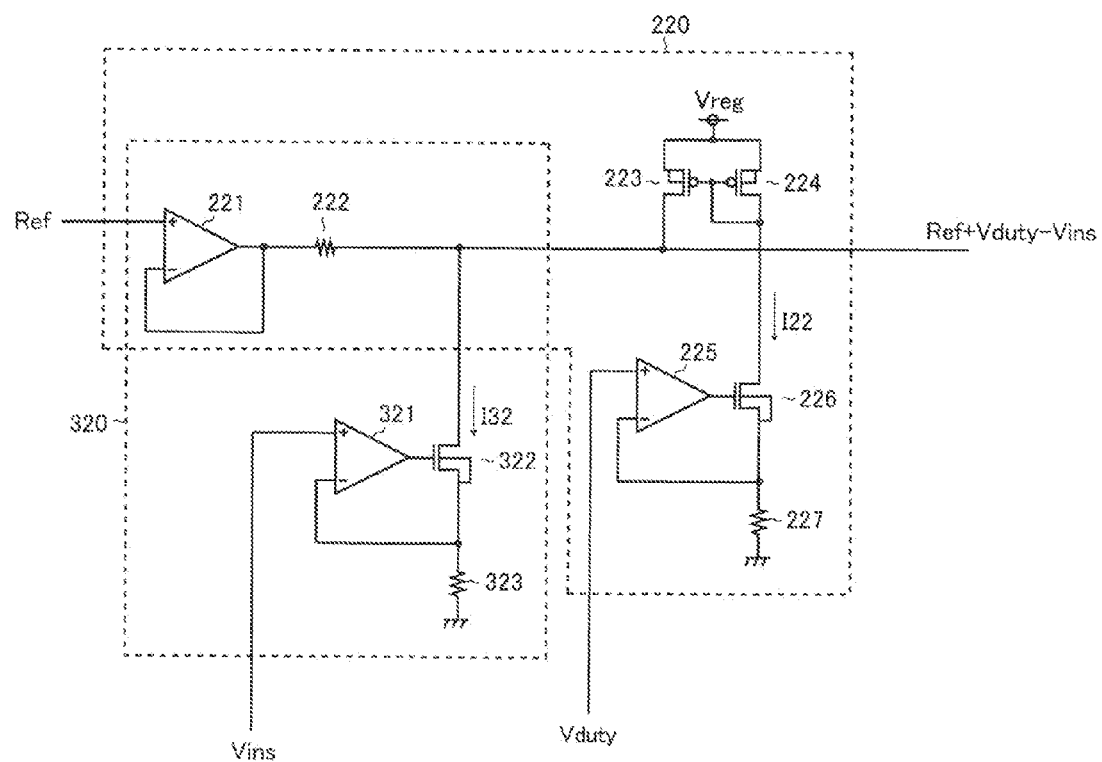
FIG. 17 is a circuit diagram showing a structural example of an addition portion and a subtraction portion.

To obviate the above problem, the ripple generation circuit 20 according to the third structural example has a structure shown in FIG. 15 to FIG. 17.

FIG. 15 is a block diagram that shows the third structural example of the ripple generation circuit 20. The ripple generation circuit 20 according to the third structural example has a structure in which a multiplied voltage generation portion 310 and a subtraction portion 320 are added to the structure in FIG. 11. The multiplied voltage generation portion 310 generates a multiplied voltage Vins by multiplying the on-duty Don of the output signal HG, the off-duty Doff of the output signal HG and a predetermined constant α', and supplies the multiplied voltage Vins to the subtraction portion 320. The subtraction portion 320 pulls down the reference voltage Ref in accordance with the multiplied voltage Vins.

Detailed structures of the multiplied voltage generation portion 310 and the subtraction portion 320 are described using FIG. 16 and FIG. 17. FIG. 16 is a circuit diagram that shows a structure in which the multiplied voltage generation portion 310 and the subtraction portion 310 are applied to the first structural example (FIG. 2). The ripple generation circuit 20 shown in FIG. 16 has basically the same structure as the above first structural example, but is characterized in that the multiplied voltage Vins is generated by using the output signal HG and the correction voltage Vduty. Accordingly, the same components as in the first structural example are indicated by the same reference numbers as in FIG. 2 to skip double description, hereinafter, description is performed focusing on characteristic portions of the third structural example.

As shown in FIG. 16, the multiplied voltage generation portion 310 has: an operational amplifier 311; an inverter 312; resistors 313 to 315; and capacitors 316 and 317.

A non-inverting input terminal (+) of the operational amplifier 311 is connected to the output terminal (application terminal for correction voltage Vduty) of the correction voltage generation portion 210. An inverting input terminal (−) of the operational amplifier 311 is connected to an output terminal of the operational amplifier 311. The output terminal of the operational amplifier 311 is connected an upper power supply terminal of the inverter 312. A lower power supply terminal of the inverter 312 is connected to the ground terminal. An input terminal of the inverter 312 is connected to an application terminal for the output signal HG. An output terminal of the inverter 312 is connected to a first terminal of the resistor 313. A second terminal of the resistor 313 is connected to a first terminal of the resistor 314. A second terminal of the resistor 314 is connected to the subtraction portion 320.

A first terminal of the resistor 315 is connected to a connection node between the resistor 313 and the resistor 314. A second terminal of the resistor 315 is connected to the ground terminal A first terminal of the capacitor 316 is connected to a connection node between the resistor 313 and the resistor 314. A second terminal of the capacitor 316 is connected to the ground terminal A first terminal of the capacitor 317 is connected to a connection node between the resistor 314 and the subtraction portion 320. A second terminal of the capacitor 317 is connected to the ground terminal.

Next, a detailed structure of the subtraction portion 320 is described using FIG. 17. FIG. 17 is a circuit diagram in a case where the subtraction portion 320 is structured sharing part of the addition portion 220 (FIG. 3). As shown in FIG. 17, the subtraction portion 320 according to the present structural example has: an operational amplifier 321; an N channel type MOS field effect transistor 322; and a resistor 323.

A non-inverting input terminal (+) of the operational amplifier 321 is connected to an application terminal for the multiplied voltage Vins. An inverting input terminal (−) of the operational amplifier 321 is connected to a connection node between the transistor 322 and the resistor 323. A output terminal of the operational amplifier 321 is connected to a gate of the transistor 322. A drain of the transistor 322 is connected to a connection node between the second terminal of the resistor 222 and the output terminal of the addition portion 220. A source of the transistor 322 is connected to a first terminal of the resistor 323. A second terminal of the resistor 323 is connected to the ground terminal.

Next, operation of the ripple generation circuit 20 according to the present structural example is described.

The operational amplifier 311 included in the multiplied voltage generation portion 310 outputs the correction voltage Vduty supplied from the correction voltage generation portion 210 as a power supply voltage for the inverter 312. The correction voltage Vduty changes in accordance with the on-duty Don of the output signal HG; therefore, it is possible to express an output voltage from the operational amplifier 311 as β×Don. In the meantime, the constant β is a constant that is given by a resistance value of the resistor included in the correction voltage generation portion 210 and the like.

The inverter 312 generates an inverted signal obtained by inverting the output signal HG by using the above output voltage (β×Don) as a power supply voltage. The resistor 313, the resistor 314, the capacitor 316 and the capacitor 317 form a two-stage CR filter, and function as a smoothing circuit that smooths the inverted signal output from the inverter 312 to generate the desired multiplied voltage Vins. In the meantime, in FIG. 16, the CR filter has the two-stage structure; but it is possible to suitably modify the number of stages in accordance with design requirements.

The inverter 312 inverts the output signal HG in logic and outputs the inverted signal. Accordingly, in a case where the power supply voltage for the inverter 312 is constant, it is possible to express an output from the CR filter as γ×Doff. In the meantime, the constant γ is a constant that is given by a resistance value of the resistor included in the CR filter and the like. On the other hand, in the present structural example, the correction voltage Vduty (=β×Don) is input as the power supply voltage for the inverter 312. Therefore, the multiplied voltage Vins becomes (β×γ)×Don×Doff.

As described above, in the multiplied voltage generation portion 310, the multiplied voltage Vins is generated by multiplying the on-duty Don of the output voltage HG, the off-duty Doff of the output signal HG and the predetermined constant α' (=β×γ).

The resistor 315 cooperates with the resistor 313 included in the CR filter to form a voltage division circuit. In the meantime, in FIG. 16, the voltage division circuit is formed by connecting the resistor 315 to the connection node between the resistor 313 and the resistor 314; but another connection form may be employed to form the voltage division circuit. For example, a connection form may be employed, in which the voltage division circuit is formed by connecting the first terminal of the resistor 315 to the second terminal of the resistor 314.

The operational amplifier 321, the transistor 322 and the resistor 323, which are included in the subtraction portion 320, function as a subtracted current generation circuit (voltage/current conversion circuit) that generates a subtracted current I32 in accordance with the multiplied voltage Vins. In this way, the subtracted current I32 is generated in accordance with the voltage value of the multiplied voltage Vins. The subtracted current I32 flows from the output terminal of the operational amplifier 211 to the ground terminal via the resistor 222, the transistor 322, and the resistor 323. Therefore, a voltage difference occurs across both terminals of the resistor 222 in accordance with an electric current value of the subtracted current I32.

Besides, also a voltage difference occurs in accordance with an electric current value of the added current I22 that is generated by the addition portion 220. As a result of this, the reference voltage Ref is pulled down in accordance with the multiplied voltage Vins, and further, the reference voltage (Ref+Vduty−Vins) after correction, which is pulled up in accordance with the correction voltage Vduty, is generated. In the meantime, the reference voltage (Ref+Vduty−Vins) after correction is output to the ripple injection portion 230.

The reference voltage (Ref+Vduty−Vins) after correction is applied to the non-inverting input terminal (+) of the operational amplifier 231 included in the ripple injection portion 230. Therefore, the reference voltage RefB after ripple injection output from the ripple injection portion 230 has a waveform whose voltage value changes with respect to the reference voltage (Ref+Vduty−Vins) after correction, that is, a waveform in which a ripple component is injected in the reference voltage (Ref+Vduty−Vins) after correction.

In the meantime, the resistance values of the resistors included in the above multiplied voltage generation portion 310 are decided in accordance with design requirements based on a change range of the ripple amplitude Vpp to be cancelled by the multiplied voltage Vins. For example, the decision is performed by means of a method that uses a formula described below.

The multiplied voltage Vins generated by the multiplied voltage generation portion 310 shown in FIG. 16 and FIG. 17 is expressed by the formula (8). In the meantime, in the formula (8), the resultant resistance value of the resistors 211 and 212 is expressed as R1, the resistance value of the resistor 213 is expressed as R2, the resultant resistance value of the resistors 313 and 314 is expressed as R5, the resistance value of the resistor 315 is expressed as R6, the resistance value of the resistor 222 is expressed as R7, the resistance value of the resistor 323 is expressed as R8, the high-level voltage of the output signal HG is expressed as Vreg, the on-duty of the output signal HG is expressed as Don, and the off-duty of the output signal HG is expressed as Doff $$Vins = \frac{R7}{R8} \times \frac{R6}{R5+R6} \times \frac{R4}{R3+R4} \times Vreg \times Don \times Doff \quad (8)$$

In the above formula (8), a portion of (R7/R8)×{R6/(R5+R6)}×{R4/(R3+R4)}×Vreg becomes a constant; therefore, when this is expressed as a constant α', the multiplied voltage Vins is expressed by the following formula (9).

$$Vins = \alpha' \times Don \times Doff \quad (9)$$

As described above, the multiplied voltage Vins changes in accordance with the multiplied value of the on-duty Don and off-duty Doff of the output signal HG.

The ripple amplitude Vpp is expressed by the above formula (6) and formula (7). A voltage to be corrected by the multiplied voltage Vins is ½ of the ripple amplitude Vpp; therefore, each resistance value is set such that the constant α' becomes ½ of the constant α. In other words, each resistance value is set such that the following formula (10) is met. In the meantime, in the formula (10), the left side indicates ½ of the constant α, while the right side indicates the constant α'.

$$\frac{1}{2} \times \frac{Vreg}{R2 \times C1 \times F} = \frac{R7}{R8} \times \frac{R6}{R5+R6} \times \frac{R4}{R3+R4} \times Vreg \quad (10)$$

An example of a function and effect obtained from the structure of the present invention mentioned above is described.

Figure 18:
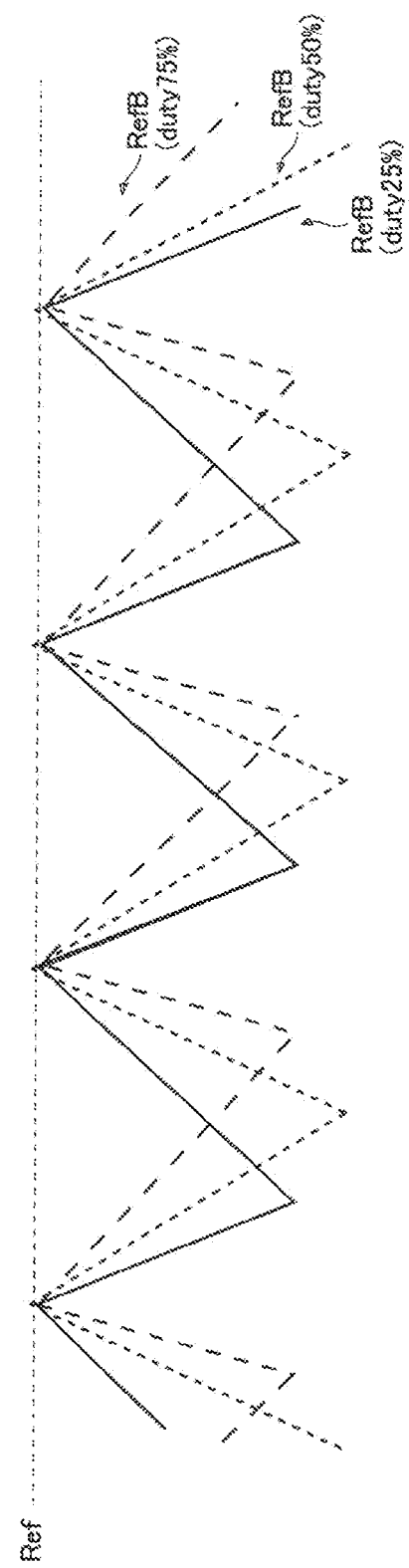
FIG. 18 is a waveform view showing a relationship between a reference voltage and a reference voltage after ripple injection in the present invention.
Figure 19:
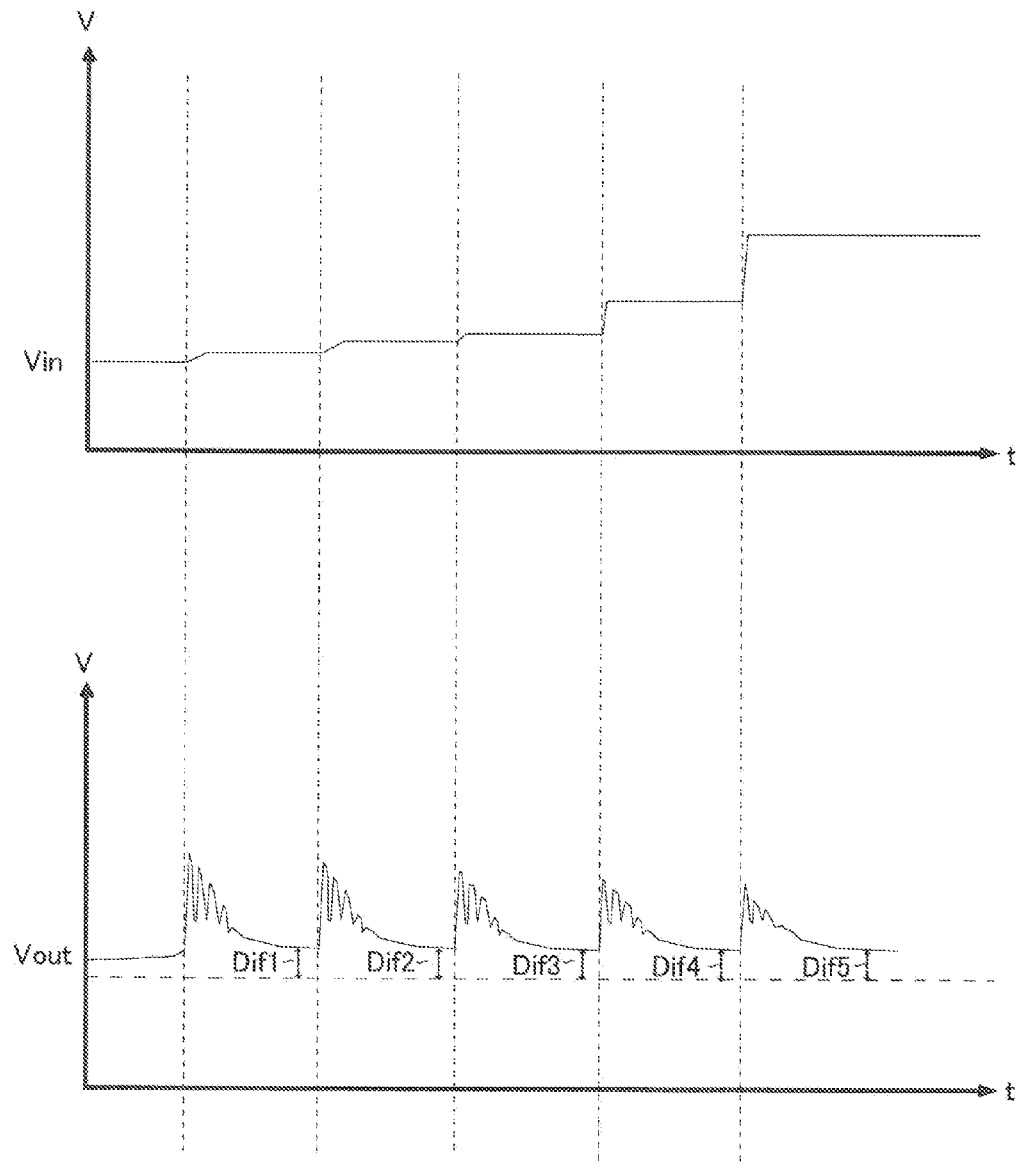
FIG. 19 is a schematic view showing an input voltage and an output voltage in the present invention.

FIG. 18 is a schematic view that shows three patterns of voltage waveforms, for different duties, of the reference voltage RefB after ripple injection generated by the ripple generation circuit 20 according to the third structural example. In the meantime, in FIG. 18, a solid line indicates a voltage waveform at a 25% on-duty, a small broken line indicates a voltage waveform at a 50% on-duty, and a large broken line indicates a voltage waveform at a 75% on-duty. FIG. 19 is a schematic view that shows the input voltage Vin and output voltage Vout of the switching power supply IC 100 that has the ripple generation circuit 20 according to the third structural example.

As shown in FIG. 18, the peak value of the reference voltage RefB after ripple injection generated by means of the reference voltage (Ref+Vduty−Vins) after correction becomes substantially even because the influence of the ripple amplitude Vpp is canceled. Therefore, as shown in FIG. 19, even if the input voltage Vin rises as time passes and the duty of the output signal HG changes, the reference voltage RefB after ripple injection does not change. Therefore, unevenness does not occur in Dif1 to Dif5.

According to the third structural example described above, the reference voltage Ref is corrected using further the multiplied voltage Vins besides the correction voltage Vduty in the first structural example; therefore, compared with the first structural example, it becomes possible to obtain a function and effect of further improving the line regulation by performing the correction with higher accuracy.

<Ripple Generation Circuit (Fourth Structural Example)>

Figure 20:
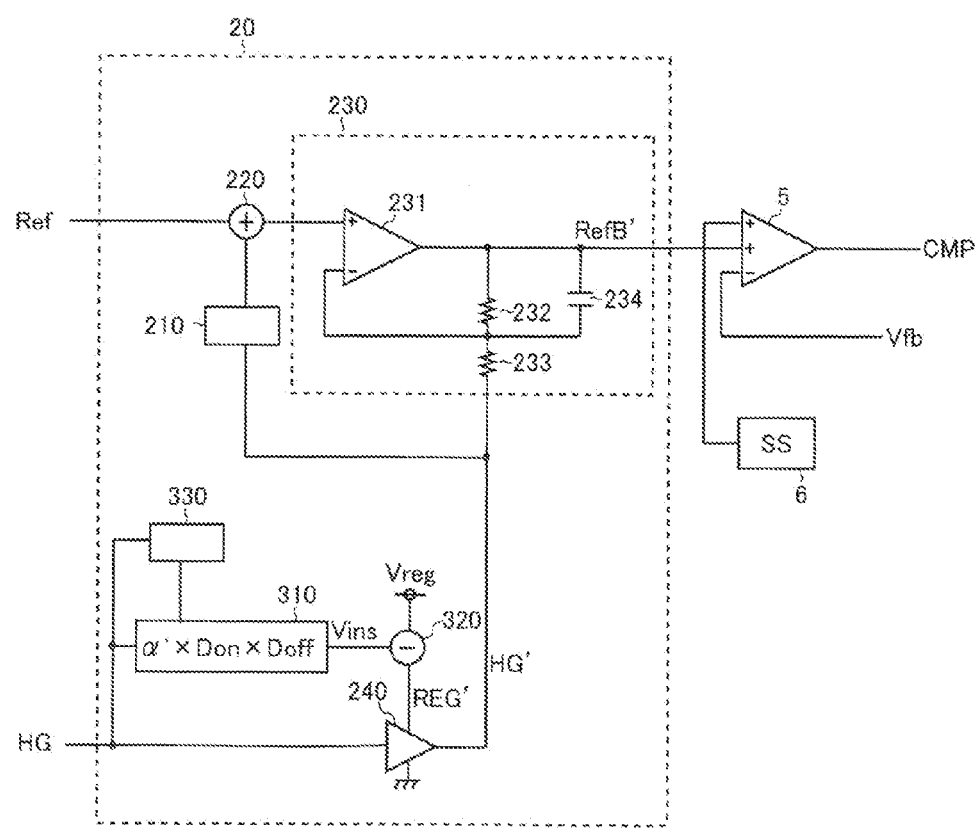
FIG. 20 is a block diagram showing a fourth structural example of the ripple generation circuit.

In the meantime, the above third structural example is described as a structural example in which the multiplied voltage generation portion 310 and the subtraction portion 320 are applied to the first structural example (FIG. 2); but, as shown in FIG. 20, besides the structure in FIG. 2, the buffer 240 is disposed between the application terminal for the output signal HG and a connection node between the resistor 233 and the correction voltage generation portion 210, a reference voltage REG' after correction for cancelling the duty change is used as a power supply voltage for the buffer 240, and an output signal HG' after correction is output from the buffer 240, whereby it is possible to obtain the same function and effect as in the above description.

As indicated by the above formula (6), the ripple amplitude Vpp changes in accordance with the multiplied value of Don and Doff. Besides, as indicated by the formula (6), the multiplied value of Don and Doff is multiplied by the power supply voltage Vreg (=high level voltage of output signal HG). Accordingly, if Vreg changes to cancel a change in the multiplied value of Don and Doff, it is possible to make the ripple amplitude constant.

In light of the above consideration, the ripple generation circuit 20 according to a fourth structural example has the structure shown in FIG. 20. The multiplied voltage generation portion 310 and the correction voltage generation portion 330 generate the multiplied voltage Vins by multiplying the on-duty Don of the output signal HG, the off-duty Doff of the output signal HG and the predetermined constant α' and supplies the multiplied voltage Vins to the subtraction portion 320.

The subtraction portion 320 pulls down the power supply voltage Vreg by the multiplied voltage Vins. In this way, the power supply voltage REG' after correction necessary for cancelling the change in the multiplied value of Don and Doff is generated and applied to an upper power supply terminal of the buffer 240. In the meantime, because detailed structures of the multiplied voltage generation portion 310 and the subtraction portion 320 are the same as the third structural example, description is skipped here. Besides, because a detailed structure of the correction voltage generation portion 330 is the same as the correction voltage generation portion 210, description is skipped here.

Figure 21:
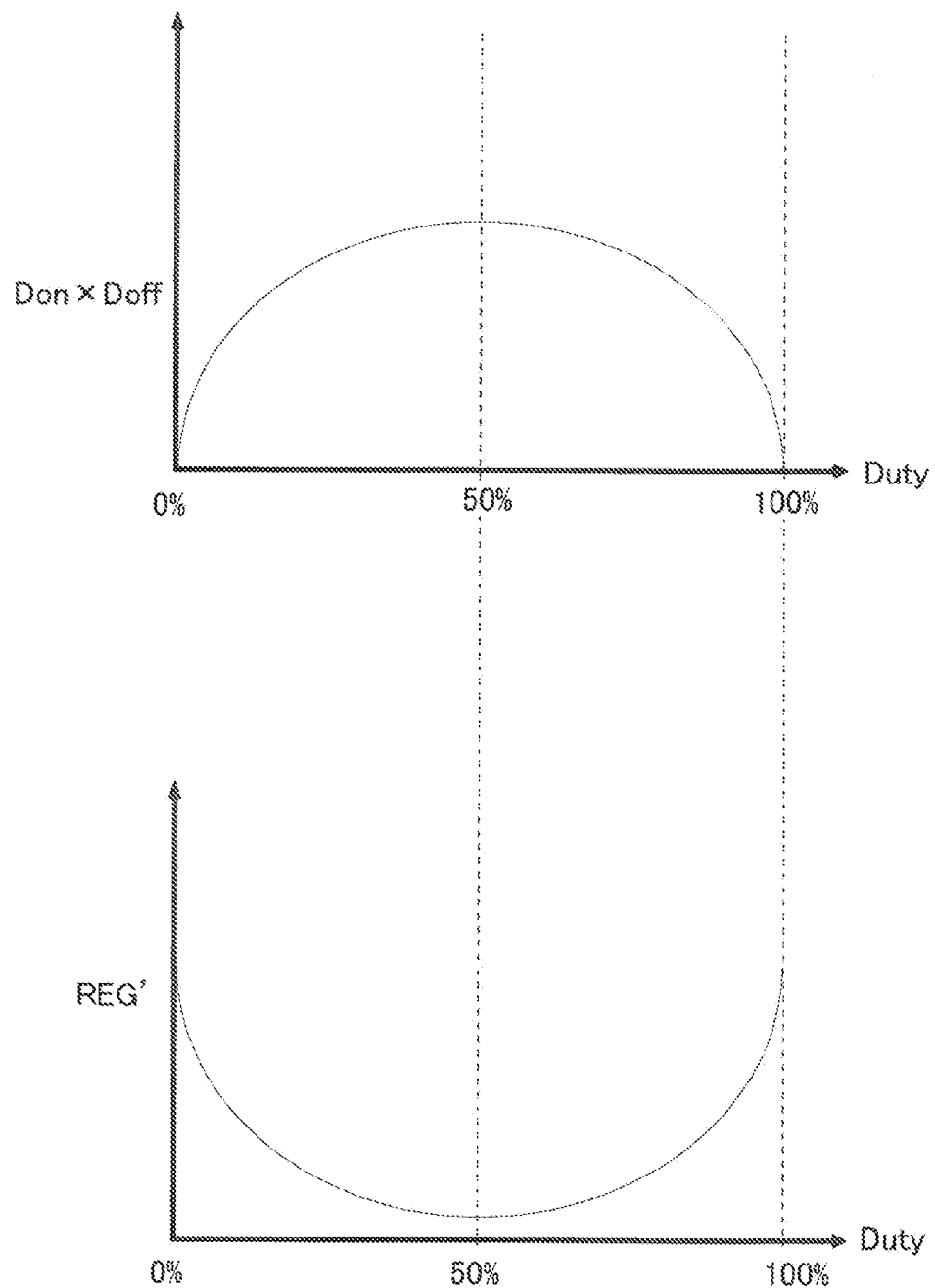
FIG. 21 is a schematic view showing a relationship among a ripple amplitude, a constant voltage after correction and a duty.

An example of the power supply voltage REG' after correction generated by the above structure is described using FIG. 21. The vertical axes of FIG. 21 indicate the multiplied value of Don and Doff and the power supply voltage REG' after correction, respectively. The horizontal axis of FIG. 21 indicates the duty (Don) of the output signal HG.

As shown in FIG. 21, the multiplied value of Don and Doff becomes maximum at a 50% duty, and decreases as the duty approaches 0% or 100%. On the other hand, the power supply voltage REG' after correction becomes minimum at the 50% duty, and increases as the duty approaches 0% or 100%. Therefore, by setting the constant α' of the multiplied voltage generation portion 310 in accordance with the duty change to be cancelled, it is possible to set REG'×Don×Doff at a constant value that does not depend on the duty change.

As described above, according to the fourth structural example, by changing the portion of Vreg×Don×Doff to the above REG'×Don×Doff, it is possible to keep response of the non-linear type constant and keep an influence of noise constant.

<Measures Against Output Drop Due to Circuit Delay>

The ripple generation circuit 20 according to the third structural example (or fourth structural example) has a structure in which the reference voltage Ref is corrected such that both of two change factors of the maximum value (top position of triangular wave) of the reference voltage RefB, that is, (1) a change component (see the second term on the right side of the formula (4b)) of an average ripple value and (2) a change component (see the left side of the formula (10)) of the ripple amplitude Vpp are cancelled and the maximum value of the reference voltage RefB becomes a desired voltage value.

Figure 22:
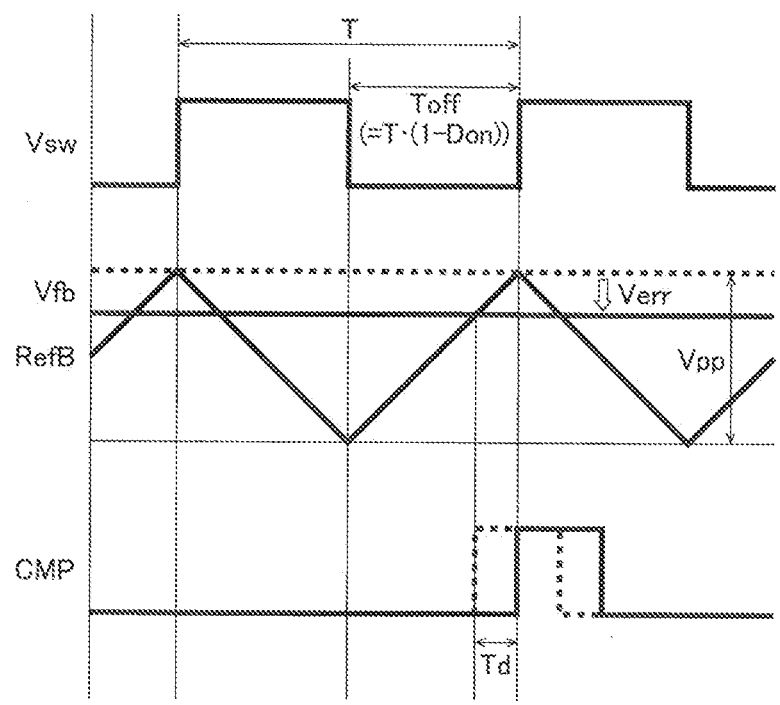
FIG. 22 is a timing chart showing a behavior in which an output drop occurs because of a circuit delay.

But, if a drive frequency F (=1/T) of the switching power supply device A is raised, a circuit delay time Td (sum of respective circuit delay times of chiefly the main comparator 5, the operational amplifier 231 and the drivers 2a and 2b) from a time when the reference voltage RefB and the feedback voltage Vfb cross each other to a time when the reference voltage RefB turns down becomes relatively large. Therefore, as shown in FIG. 22, the feedback voltage Vfb becomes lower than the maximum value of the reference voltage RefB by a delay drop voltage Verr, and the output voltage Vout deviates from a desired value.

In the meantime, if the main comparator 5 and the like are speeded, the above problem is obviated; but, to achieve this, it is necessary to increase the electric current consumption of the circuit. In other words, the high frequency and low power consumption of the switching power supply device A are in a tradeoff relationship.

Here, the following formula (11) is satisfied between the circuit delay time Td and the delay drop voltage Verr.

$$Verr = Td \times Vpp \times \frac{1}{T \times (1 - Don)} \qquad (11)$$

Besides, the ripple amplitude Vpp is expressed by the above formula (6). Accordingly, by substituting the formula (6) for the formula (11) and making arrangement, it is possible to calculate the delay drop voltage Verr by means of the following formula (12).

$$Verr = \frac{Td \times Vreg \times Don}{R2 \times C1} \qquad (12)$$

As described above, it is understood that like the average ripple value (DC value of reference voltage RefB), the delay drop voltage Verr changes in accordance with the on-duty Don.

Accordingly, if the circuit constants (especially, the resistance values R1 to R4, the resistance value R7, the resistance value R9, and the capacitance value C1) of the ripple generation circuit 20 are selected to meet the following formula (13), it is possible to cancel not only a change component of the average ripple value in accordance with the on-duty Don but also a change component (delay drop voltage Verr) of the output voltage Vout due to the circuit delay. Accordingly, it is possible to achieve both the high frequency and low power consumption of the switching power supply device A without depending on input/output conditions.

$$-\left(\frac{Td}{R2 \times C1} + \frac{R1}{R2}\right) \times Vreg \times Don = \frac{R7}{R9} \times \frac{R4}{R3 + R4} \times Vreg \times Don \quad (13)$$

<Ripple Generation Circuit (Fifth Structural Example)>

Figure 23:
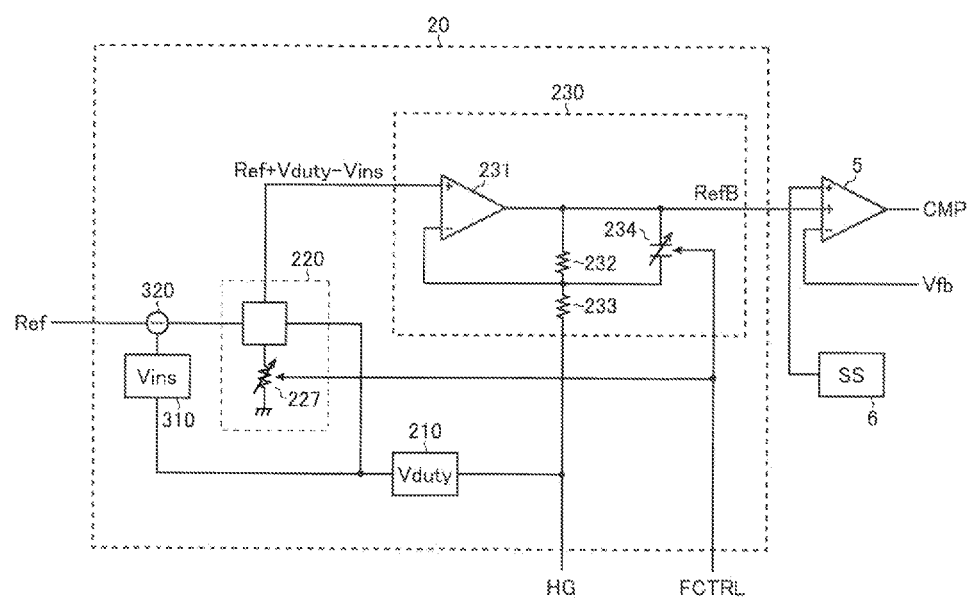
FIG. 23 is a block diagram showing a fifth structural example of the ripple generation circuit.

FIG. 23 is a block diagram that shows a fifth structural example of the ripple generation circuit 20. The ripple generation circuit 20 according to the fifth structural example has the substantially same structure as the above third structural example (FIG. 16 and FIG. 27), and is characterized to be compatible with switchover control of the drive frequency F that uses a frequency switchover signal FCTRL. Accordingly, the same components as in the third structural example are indicated by the same reference numbers as in FIG. 16 and FIG. 17 to skip double description, and hereinafter, description is performed focusing on characteristic portions of the fifth structural example.

The frequency switchover signal FCTRL is a control signal input into the on-time setting portion 7 (see FIG. 1), and is used to switch the on-time Ton of the output signal HG to change the drive frequency F. Besides, when switching the drive frequency F, to meet the above formula (10), it is also necessary to apply variable control to the capacitance value C1 of the capacitor 234 included in the ripple injection portion 230 in accordance with the frequency switchover signal FCTRL. For example, in a case of switching the drive frequency F to 2-fold, the capacitance value C1 of the capacitor 234 is switched to ½.

As described above, if the capacitance value C1 is switched, then, to meet the above formula (13), it becomes necessary to adjust at least one of the resistance values R1 to R4, the resistance value R7 and the resistance value R9. But, if the resistance values R1 to R4, or the resistance value R7 is adjusted, the relationship of the above formula (10) is broken again, and it becomes necessary to adjust another circuit constant. On the other hand, if the variable control is applied to the resistance value R9 in the same way as the capacitance value C1, it is possible to meet both the above formula (10) and formula (13) with no need to adjust the other circuit constants.

Accordingly, in the ripple generation circuit 20 according to the fifth structural example, a structure is employed, in which as to the capacitor 234 and the resistor 227, the variable control is applied to the capacitance value C1 and the resistance value R9 in accordance with the frequency switchover signal FCTRL. For example, when the capacitance value C1 is switched to ½, the resistance value R9 also is switched to ½. By employing such structure, it becomes possible to deal with the switchover control of the drive frequency F curbing the adjustment of the circuit constant to the least.

Figure 24:
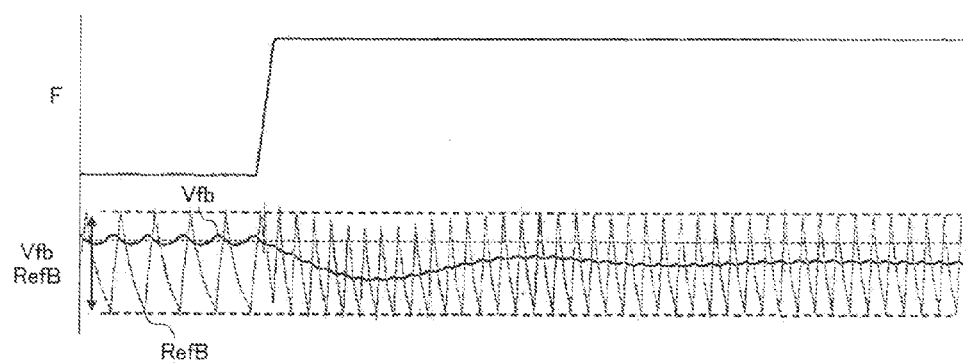
FIG. 24 is a timing chart showing a behavior in which a DC deviation occurs during a frequency switchover time.
Figure 25:
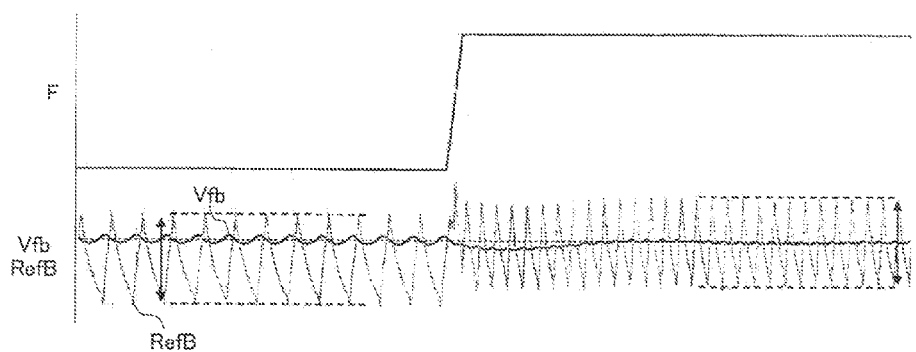
FIG. 25 is a timing chart showing a behavior in which a DC deviation during a frequency switchover time is curbed.

FIG. 24 and FIG. 25 are respectively a timing chart that shows a behavior in which a DC deviation of the feedback voltage Vfb (and output voltage Vout) occurs during the switchover time of the drive frequency F and a timing chart that shows a behavior in which the CD deviation is curbed.

If the circuit constant of the ripple generation circuit 20 is set without considering the change component (delay drop voltage Verr) of the output voltage Vout due to the circuit delay, the higher the drive frequency F is, the larger the delay drop voltage Verr becomes; therefore, the DC deviation of the feedback voltage Vfb occurs before and after the switchover of the drive frequency F (see FIG. 24).

On the other hand, if the circuit constant of the ripple generation circuit 20 is set to meet the above formula (13) in light of the change component of the output voltage Vout due to the circuit delay, the reference voltage RefB is shifted vertically in accordance with the drive frequency F; therefore, it becomes possible to curb the DC deviation of the feedback voltage Vfb and an over/undershoot due to the DC deviation (see FIG. 25).

<Switching Power Supply Device (Second Embodiment)>

Figure 26:
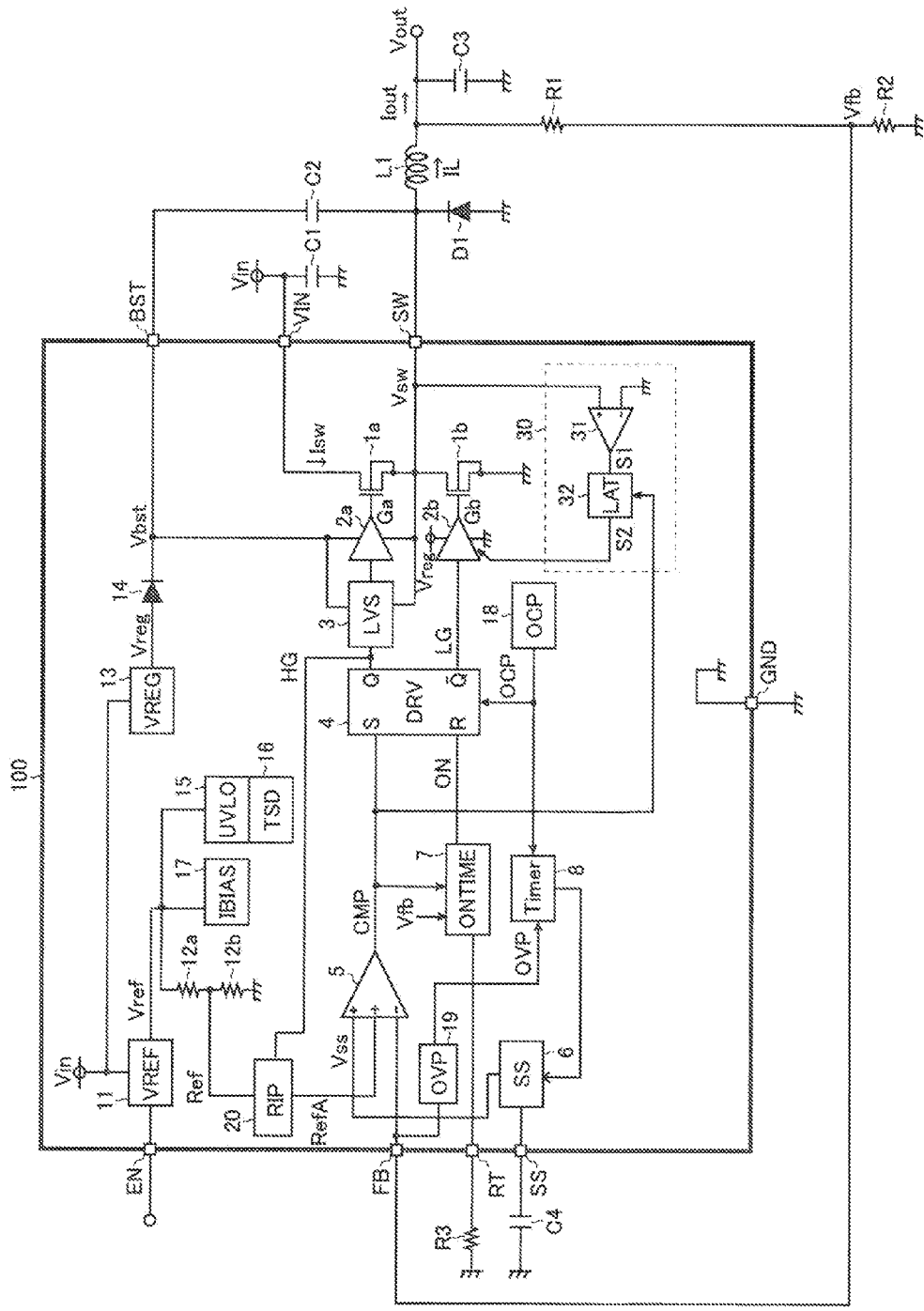
FIG. 26 is a block diagram showing a second embodiment of the switching power supply device.

FIG. 26 is a block diagram that shows a second embodiment of the switching power supply device. The switching power supply device 1 according to the second embodiment is characterized in that a backward flow detection circuit 30 is added to the basis of the first embodiment described above and a switching stop operation during a light load time is performed.

The backward flow detection circuit 30 is a circuit block that monitors a zero crossing point where the switch voltage Vsw changes from negative to positive during an on-duration of the transistor 1b, thereby detecting a backward flow current (inductor current IL that flows backward from the inductor L1 to the ground terminal via the transistor 1b) to the transistor 1b, and includes a comparator 31 and a latch portion 32.

The comparator 31 compares the switch voltage Vsw applied to a non-inverting input terminal (+) and a ground voltage GND applied to an inverting input terminal (−) with each other to generate a zero crossing detection signal S1. The zero crossing detection signal S1 goes to a low level when the switch voltage Vsw is lower than the ground voltage GND, and goes to a high level when the switch voltage Vsw is higher than the ground voltage GND. In other words, the zero crossing detection signal S1 goes to the low level when the inductor current IL flows from the ground terminal to the inductor L1 via the transistor 1b, and goes to the high level when the inductor current IL flows backward from the inductor L1 to the ground terminal via the transistor 1b.

The latch portion 32 sets a skip signal S2 to a high level at a rising edge of the zero crossing detection signal S1, and resets the skip signal S2 to a low level at a rising edge of the comparison signal CMP (or output signal HG). In other words, the skip signal S2 is latched to the high level when a backward flow current to the transistor 1b is detected, and reset to the low level immediately before the transistor 1b is turned on next.

The driver 2b generates a gate voltage Gb to turn on/off the transistor 1b in accordance with the output signal LG when the skip signal S2 is at the low level, and generates the gate voltage Gb to forcibly turn off the transistor 1b without depending on the output signal LG when the skip signal S2 is at the high level.

Figure 27:
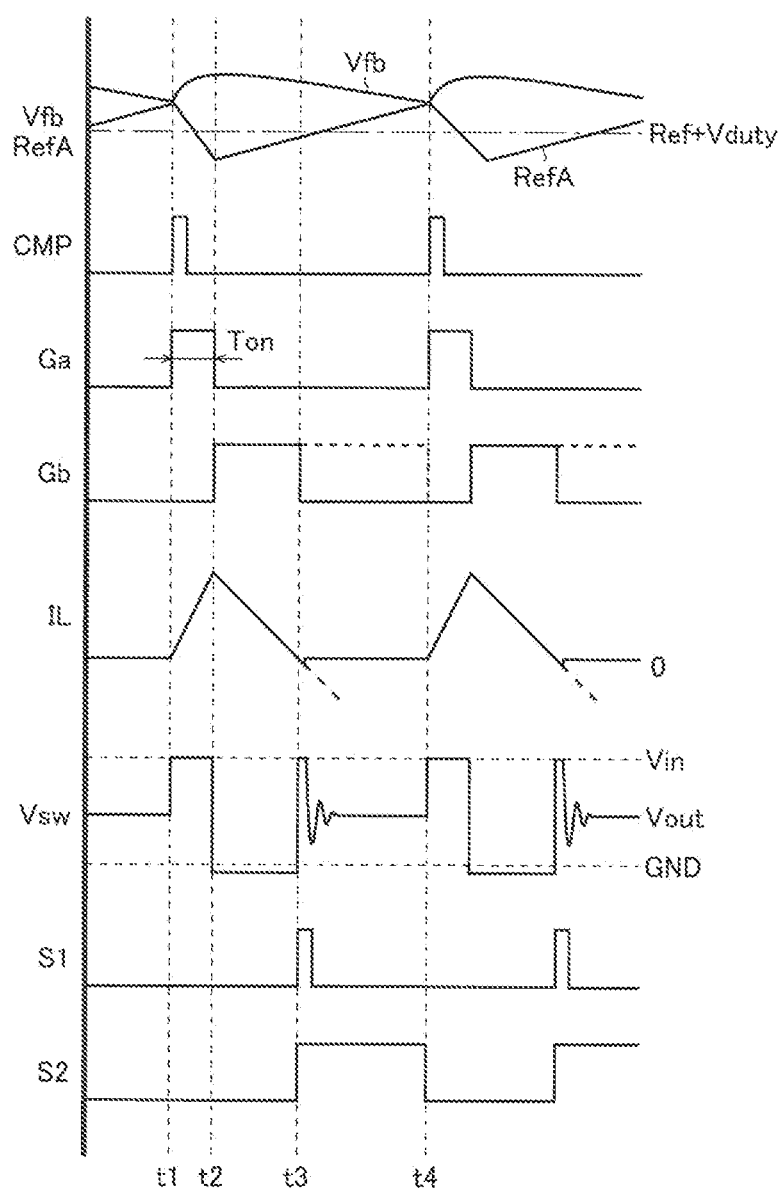
FIG. 27 is a time chart for describing a switching stop operation during a light load time.

FIG. 27 is a time chart for describing a switching stop operation during a light load time, and illustrates in order from top: the feedback voltage Vfb and the reference voltage RefA; the comparison signal CMP; the gate voltages Ga and Gb; the inductor current IL; the switch voltage Vsw; the zero crossing detection signal S1; and the skip signal S2.

From time points t1 to t2, the gate voltage Ga is kept at a high level and the gate voltage Gb is kept at a low level;

therefore, the transistor 1a is turned on and the transistor 1b is turned off. Accordingly, from the time points t1 to t2, the switch voltage Vsw rises to substantially the input voltage Vin, and the inductor current IL increases.

At the time point t2, if the gate voltage Ga is dropped to a low level and the gate voltage Gb is raised to a high level, the transistor 1a is turned off and the transistor 1b is turned on. At this time, an induced electromagnetic force occurs across the inductor IL to keep the inductor current IL flowing in the same direction; therefore, the inductor current IL flows from the ground terminal into the inductor L1 via the transistor 1b. Accordingly, the switch voltage Vsw declines to a negative voltage value that is lower than the ground voltage GND by a dropped voltage across the transistor 1b.

Here, during a heavy load time when the output current Iout flowing in the load is sufficiently large, energy stored in the inductor L1 is large; therefore, the inductor current IL keeps flowing to the load without becoming lower than a zero value until a time point t4 when the gate voltage Ga is raised again to the high level. On the other hand, during the light load time when the output current Iout flowing in the load is small, the energy stored in the inductor L1 is a little; therefore, at a time point t3, the inductor current IL becomes lower than the zero value, and a backward flow current to the transistor 1b occurs. In such state, electric charges stored in the capacitor C3 are discarded, which causes an efficiency decline during the light load time.

Accordingly, the switching power supply device 1 according to the second embodiment has a structure that detects the backward flow current to the transistor 1b by using the backward flow detection circuit 30 and forcibly turns off the transistor 1b during a high level duration (from time points t3 to t4) of the skip signal S2. By employing such structure, it becomes possible to obviate the efficiency decline during the light load time.

Besides, as to the switching power supply device 1 according to the second embodiment, the internal structure of the ripple generation circuit 20 for performing switching stop control at a time of detecting a backward flow current is under review. Hereinafter, a sixth structural example of the ripple generation circuit 20 is described in detail with reference to FIG. 28.

<Ripple Generation Circuit (Sixth Structural Example)>

Figure 28:
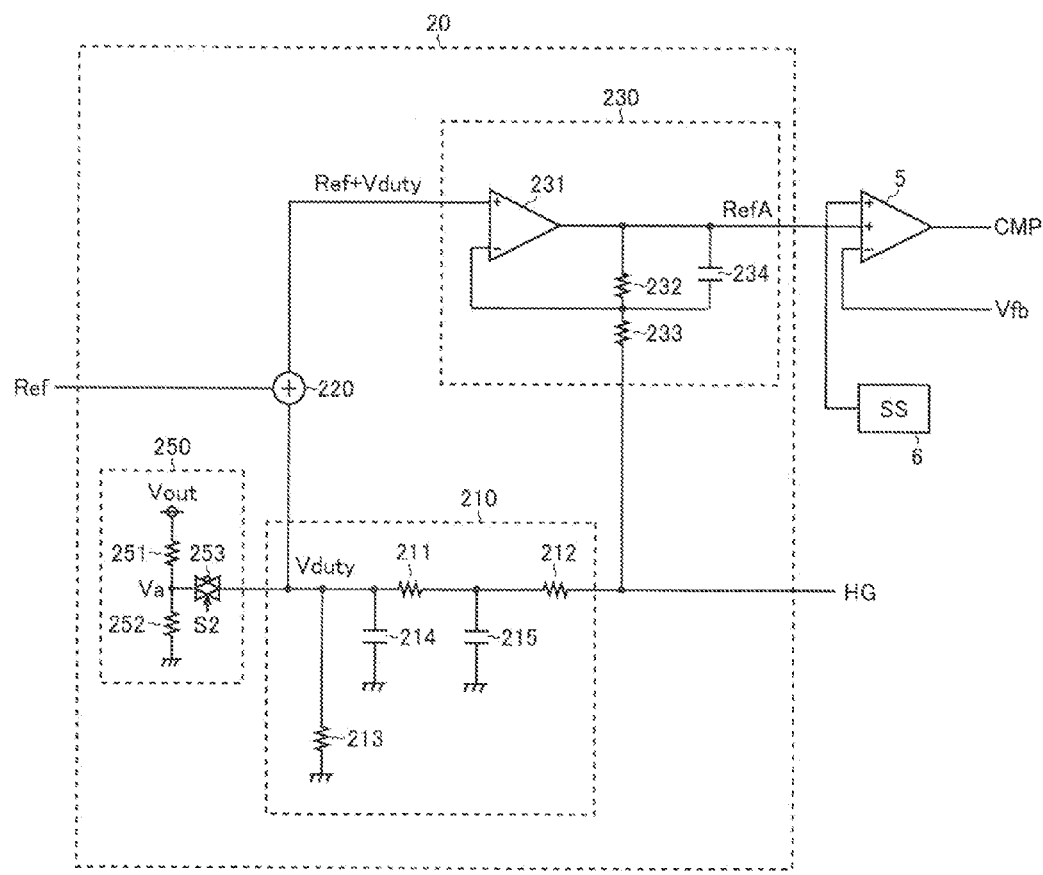
FIG. 28 is a circuit diagram showing a sixth structural example of the ripple generation circuit.

FIG. 28 is a circuit diagram that shows a sixth structural example of the ripple generation circuit 20. The sixth structural example has the substantially same structure as the above first structural example, but is characterized in that a correction voltage auxiliary circuit 250 is disposed. Accordingly, the same components as in the first structural example are indicated by the same reference numbers as in FIG. 2 to skip double description, and hereinafter, description is performed focusing on characteristic portions of the sixth structural example.

The correction voltage auxiliary circuit 250 is a circuit block that applies an auxiliary voltage Va to the application terminal for the correction voltage Vduty when the backward flow current to the transistor 1b is detected, and includes resistors 251 and 252 and an analog switch 253.

The resistors 251 and 252 are connected in series between the application terminal for the output voltage Vout and the ground terminal, and form a voltage division circuit that generates the auxiliary voltage Va by dividing the output voltage Vout. It is desirable to set resistance values of the resistors 251 and 252 considering a voltage change range of the input voltage Vin applied to the switching power supply device such that the auxiliary voltage Va has a voltage value (voltage value slightly higher than Vout/Vin) that is as approximate to Vout/Vin as possible.

The analog switch 253 performs connection/disconnection between the application terminal for the correction voltage Vduty and the application terminal for the auxiliary voltage Va in accordance with the skip signal S2 (i.e., detection or non-detection of the backward flow current). More specifically, the analog switch 253 is turned on when the skip signal S2 is at the high level, and turned off when the skip signal S2 is at the low level.

In other words, the correction voltage auxiliary circuit 250 applies the auxiliary voltage Va to the application terminal for the correction voltage Vduty during the time the skip signal S2 is kept at the high level. By employing such structure, it is possible to curb a decline in the correction voltage Vduty (duty information) due to a switching stop at the time of detecting a backward flow current; therefore, it becomes possible to achieve high efficiency during the light load time without impairing the above improvement effect of the line regulation.

In the meantime, in FIG. 28, the structure, in which the correction voltage auxiliary circuit 250 is added to the basis of the first structural example, is described as an example; but the structure of the present invention is not limited to this, but a structure may be employed, in which the correction voltage auxiliary circuit 250 is added to the basis of the second structural example.

<Application to Television>

Figure 29:
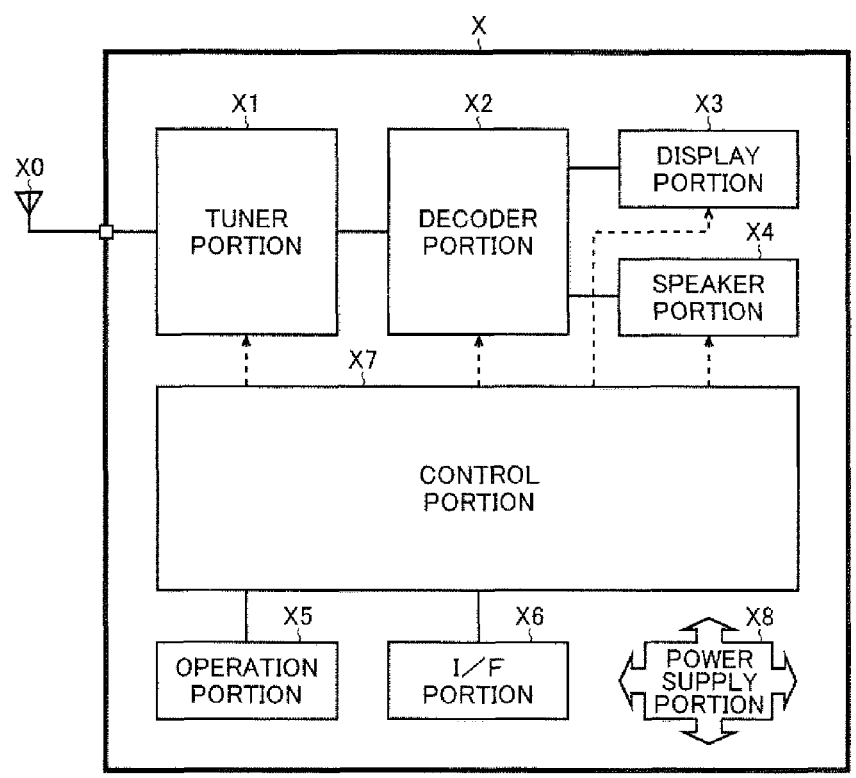
FIG. 29 is a block diagram showing a structural example of a television that incorporates the switching power supply device.
Figure 30A:
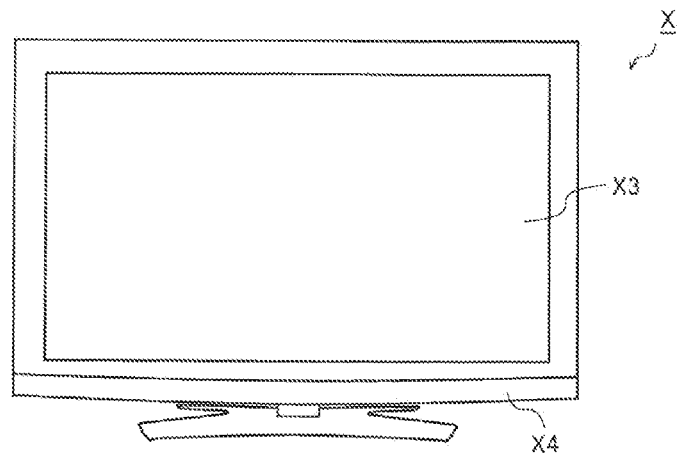
FIG. 30A is a front view of a television that incorporates the switching power supply device.
Figure 30B:
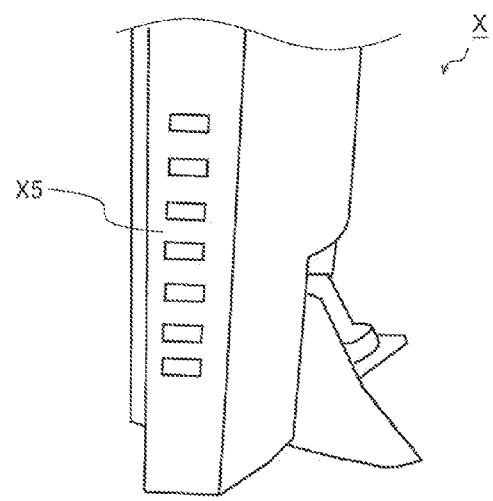
FIG. 30B is a side view of the television that incorporates the switching power supply device.
Figure 30C:
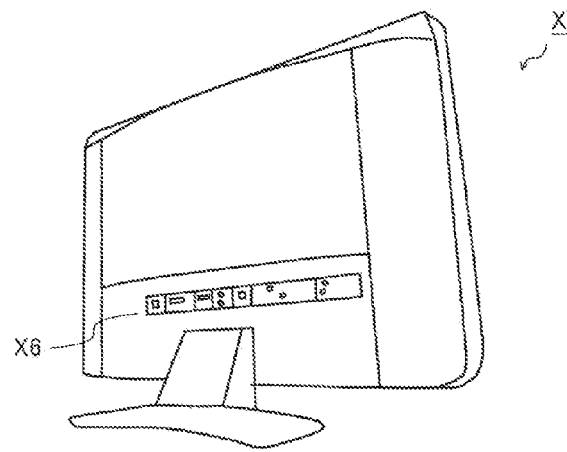
FIG. 30C is a rear view of the television that incorporates the switching power supply device.
Figure 31A:
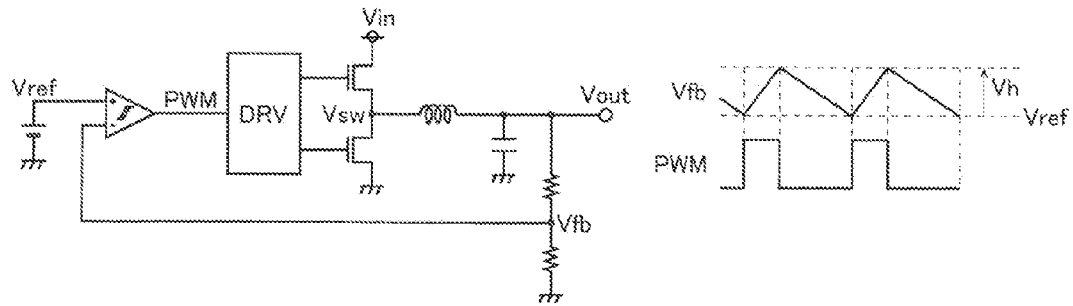
FIG. 31A is a circuit block diagram and an operation waveform view showing a first conventional example (hysteresis window system) of a switching power supply device that employs a non-linear control system.
Figure 31B:
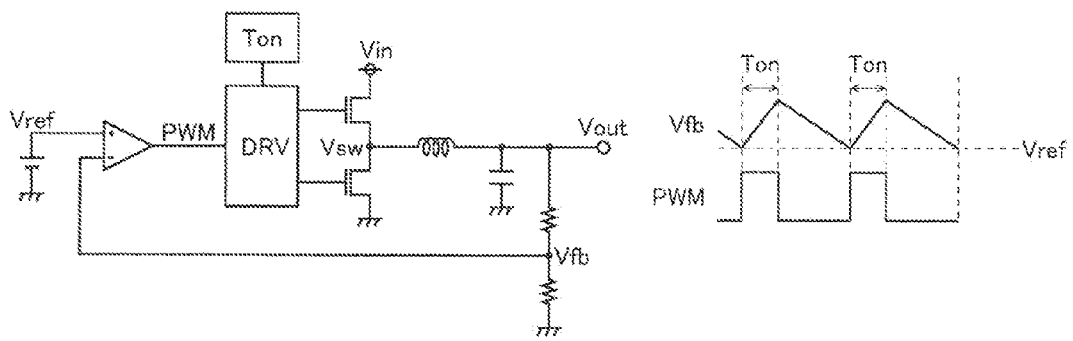
FIG. 31B is a circuit block diagram and an operation waveform view showing a second conventional example (bottom detection on-time fixing system) of the switching power supply device that employs the non-linear control system.
Figure 31C:
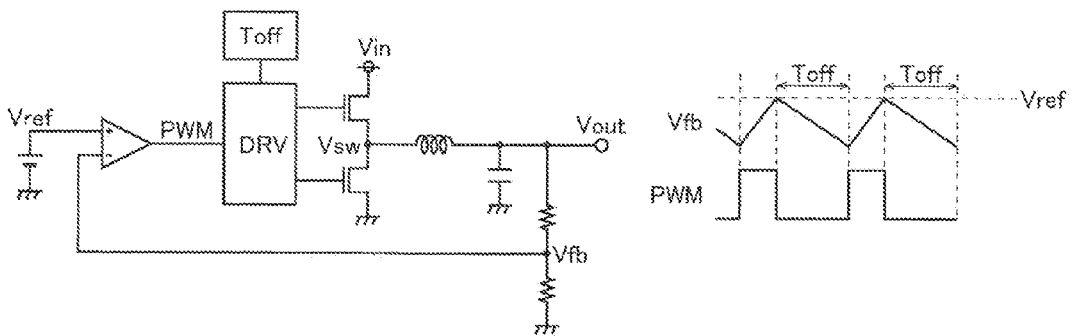
FIG. 31C is a circuit block diagram and an operation waveform view showing a third conventional example (upper detection off-time fixing system) of the switching power supply device that employs the non-linear control system.

FIG. 29 is a block diagram that shows a structural example of a television that incorporates the switching power supply device. Besides, FIG. 30A to FIG. 30C are a front view, a side view, and a rear view of a television that incorporates the switching power supply device, respectively. A television X according to the present structural example has: a tuner portion X1; a decoder portion X2; a display portion X3; a speaker portion X4; an operation portion X5; an interface portion X6; a control portion X7; and a power supply portion X8.

The tuner portion X1 selects a broadcast signal for a desired channel from received signals received by an antenna X0 that is externally connected to the television X.

The decoder portion X2 generates an image signal and a sound signal from the broadcast signal selected by the tuner X1. Besides, the decoder portion X2 includes a function as well to generate an image signal and a sound signal based on an external input signal from the interface portion X6.

The display portion X3 outputs the image signal generated by the decoder portion X2 as an image.

The speaker portion X4 outputs the sound signal generated by the decoder portion as a sound signal.

The operation portion X5 is one of human interfaces that receive a user's operation. As the operation portion X5, it is possible to use a button, a switch, a remote controller and the like.

The interface portion X6 is a frond end that receives an external input signal from external devices (a optical disc player, a hard disc drive and the like).

The control portion X7 comprehensively controls operation of each of the above portions X1 to X6. As the control portion X7, it is possible to use a CPU (central processing unit) and the like.

The power supply portion X8 supplies electric power to each of the above portions X1 to X7. As the power supply portion X8, it is possible to suitably use the above switching power supply device A.

<Summing Up>

Hereinafter, the various inventions disclosed in the present specification are summed up.

[First Invention]

Of the various inventions disclosed in the present specification, the switching power supply device according to the first invention is a switching power supply device of the non-linear control type which injects a ripple component into a reference voltage and performs on/off control of a switch device in accordance with a comparison result between the reference voltage after ripple injection and a feedback voltage to generate an output voltage from an input voltage, the switching power supply device has the structure (the 1-1 structure) which has: a reference voltage generation portion that generates the reference voltage; a ripple injection portion that uses a pulse voltage indicating on/off states of the switch device to generate a ripple component and injects the ripple component into the reference voltage; a multiplied voltage generation portion that generates a multiplied voltage in accordance with a multiplied value of an on-duty and an off-duty of the pulse voltage; a subtraction portion that pulls down, in accordance with the multiplied voltage, the reference voltage before ripple injection or a power supply voltage for a buffer that supplies the pulse voltage, which have a constant crest value, to the ripple injection portion; a comparator that compares a feedback voltage and the reference voltage after ripple injection with each other; and a switching control portion that performs on/off control of the switch device based on an output signal from the comparator.

In the meantime, the switching power supply device having the above 1-1 structure may have the structure (the 1-2 structure) in which the multiplied voltage generation portion includes: an inverter that receives supply of a power supply voltage changing in accordance with the on-duty of the pulse voltage to operate and generates an inverted pulse voltage that is obtained by is inverting the pulse voltage in logic; and a filter portion that smooths the inverted pulse voltage to generate the multiplied voltage.

Besides, the switching power supply device having the above 1-2 structure may have the structure (the 1-3 structure) in which the filter portion includes at least one stage of CR filter that smooths the inverted pulse voltage.

Besides, the switching power supply device having the 1-3 structure may have the structure (the 1-4 structure) in which the filter portion includes a voltage division resistor that cooperates with a smoothing resistor included in the CR filter to form a voltage division circuit; and a connection node between the smoothing resistor and the voltage division resistor corresponds to an input terminal or an output terminal of the filter portion.

Besides, the switching power supply device having the 1-4 structure may have the structure (the 1-5 structure) which has a correction voltage generation portion that smooths the pulse voltage to generate a correction voltage in accordance with the on-duty of the pulse voltage, and an addition portion that adds the correction voltage to the reference voltage before ripple injection, wherein the inverter operates on the correction voltage as a power supply voltage.

Besides, the switching power supply device having any one of the 1-1 to 1-5 structures may have the structure (the 1-6 structure) in which the pulse voltage is an on/off signal for the switch device.

Besides, the switching power supply device having any one of the 1-1 to 1-5 structures may have the structure (the 1-7 structure) in which the pulse voltage is a switch voltage appearing at one terminal of the switch device.

Besides, the switching power supply device having the 1-7 structure may have the structure (the 1-8 structure) which has a buffer that supplies the on/off signal or the switch voltage, which have a constant crest value, to the ripple injection portion, the multiplied voltage generation portion and the correction voltage generation portion.

Besides, the switching power supply device having any one of the 1-5 to 1-8 structures may have the structure (the 1-9 structure) in which the ripple injection portion includes a first amplifier whose non-inverting input terminal is connected to the addition portion and whose inverting input terminal is connected to an output terminal, and a pulse drive portion that is connected between an input terminal for the pulse voltage and a connection node between the inverting input terminal and output terminal of the first amplifier.

Besides, the switching power supply device having any one of the 1-1 to 1-9 structures may have the structure (the 1-10 structure) in which the subtraction portion includes: a second amplifier whose non-inverting input terminal is connected to an input terminal for the reference voltage before ripple injection and whose inverting input terminal is connected to an output terminal; a first resistor whose first terminal is connected to an output terminal of the second amplifier; an N channel type transistor whose drain is connected to a second terminal of the first resistor; a second resistor that is connected between a ground terminal and a source of the transistor; and a third amplifier whose non-inverting input terminal is connected to an input terminal for the multiplied voltage, whose inverting input terminal is connected to a connection node between the second resistor and the source of the transistor, and whose output terminal is connected to a gate of the transistor.

Besides, the television according to the first invention has the structure which has: a tuner portion that selects, from received signals, a broadcast signal for a desired channel; a decoder portion that generates an image signal and a sound signal from the broadcast signal selected by the tuner portion; a display portion that outputs the image signal as an image; a speaker portion that outputs the sound signal as a sound; an operation portion that receives a user's operation; an interface portion that receives an external input signal; a control portion that comprehensively controls operation of each of the portions; and a power supply portion that supplies electric power to each of the portions, wherein the power supply portion includes the switching power supply device having any one of the 1-1 to 1-10 structures.

[Second Invention]

Of the various inventions disclosed in the present specification, the switching power supply device according to the second invention is a switching power supply device of the non-linear control type which injects a ripple component into a reference voltage and performs on/off control of a switch device in accordance with a comparison result between the reference voltage after ripple injection and a feedback voltage to generate an output voltage from an input voltage, the switching power supply device has the structure (the 2-1 structure) which has: a reference voltage generation portion that generates the reference voltage; a ripple injection portion that uses a pulse voltage indicating on/off states of the switch device to generate a ripple component and injects the ripple component into the reference voltage; a correction voltage generation portion that generates a correction voltage in accordance with a duty of the pulse voltage; an addition portion that adds the correction voltage to the reference voltage before ripple injection; a main comparator that compares the feedback voltage and the reference voltage after ripple injection; and a switching control portion that performs on/off control of the switch device based on an output signal from the main comparator.

In the meantime, the switching power supply device having the above 2-1 structure may have the structure (the 2-2 structure) in which the correction voltage generation portion has at least one stage of CR filter that smooths the pulse voltage to generate the correction voltage.

Besides, the switching power supply device having the 2-2 structure may have the structure (the 2-3 structure) in which the correction voltage generation portion has a second resistor that cooperates with a first resistor included in the CR filter to form a voltage division circuit; and a connection node between the first resistor and the second resistor corresponds to an input terminal for the pulse voltage or an output terminal for the correction voltage.

Besides, the switching power supply device having any one of the 2-1 to 2-3 structures may have the structure (the 2-4 structure) in which the pulse voltage is an on/off signal for the switch device.

Besides, the switching power supply device having the 2-1 to 2-3 structures may have the structure (the 2-5 structure) in which the pulse voltage is a switch voltage appearing at one terminal of the switch device.

Besides, the switching power supply device having the 2-5 structure may have the structure (the 2-6 structure) which has a buffer that supplies the switch voltage, which has a constant crest value, to the ripple injection portion and the correction voltage generation portion.

Besides, the switching power supply device having any one of the 2-1 to 2-6 structures may have the structure (the 2-7 structure) in which the ripple injection portion has a first amplifier whose non-inverting input terminal is connected to the addition portion and whose inverting input terminal is connected to an output terminal, and a pulse drive portion that is connected between an input terminal for the pulse voltage and a connection node between the inverting input terminal and output terminal of the first amplifier.

Besides, the switching power supply device having any one of the 2-1 to 2-7 structures may have the structure (the 2-8 structure) in which the addition portion has: a second amplifier whose non-inverting input terminal is connected to an input terminal for the reference voltage before ripple injection and whose inverting input terminal is connected to an output terminal; a third resistor whose first terminal is connected to an output terminal of the second amplifier; a fourth resistor that is connected between a ground terminal and a source of an N channel type transistor; a third amplifier whose non-inverting input terminal is connected to an input terminal for the correction voltage, whose inverting input terminal is connected to a connection node between the fourth resistor and the source of the transistor, and whose output terminal is connected to a gate of the transistor; and a current mirror portion whose first terminal is connected to a second terminal of the third resistor and whose second terminal is connected to a drain of the transistor.

Besides, the switching power supply device having any one of the 2-1 to 2-8 structures may have the structure (the 2-9 structure) which further has a backward flow current detection circuit that detects a backward flow current to the switch device, wherein the switching control portion forcibly turns off the switch device when the backward flow current is detected.

Besides, the switching power supply device having the 2-9 structure may have the structure (the 2-10 structure) which has a correction voltage auxiliary circuit that applies an auxiliary voltage to an application terminal for the correction voltage when the backward flow current is detected.

Besides, the switching power supply device having the 2-10 structure may have the structure (the 2-11 structure) which includes a voltage division circuit that divides the output voltage to generate the auxiliary voltage; and an analog switch that performs connection/disconnection between the application terminal for the correction voltage and an application terminal for the auxiliary voltage in accordance with detection/non-detection of the backward flow current.

Besides, the switching power supply device having the 2-11 structure may have the structure (the 2-12 structure) in which the switch device is connected between one terminal of an inductor and an application terminal for a ground voltage; during an on-duration of the switch device, the backward flow current detection circuit monitors a zero crossing point, where a switch voltage appearing at one terminal of the switch device changes from negative to positive, to detect the backward flow current to the switch device.

Besides, the switching power supply device having the 2-12 structure may have the structure (the 2-13 structure) in which the backward flow current detection circuit includes: a comparator that compares the switch voltage and the ground voltage with each other to generate a zero crossing detection signal; and a latch portion that generates a skip signal which is set to a first logic level by a pulse edge of the zero crossing detection signal and reset to a second logic level by a pulse edge of the comparison signal.

Besides, the switching power supply device having the 2-13 structure may have the structure (the 2-14 structure) in which the switching control portion forcibly turns off the switch device during a time the skip signal is kept at the first logic level.

Besides, the switching power supply device having the 2-14 structure may have the structure (the 2-15 structure) in which the correction voltage auxiliary circuit applies the auxiliary voltage to the application terminal for the correction voltage during a time the skip signal is kept at the first logic level.

Besides, the television according to the second invention includes the structure (the 2-16 structure) which has: a tuner portion that selects, from received signals, a broadcast signal for a desired channel; a decoder portion that generates an image signal and a sound signal from the broadcast signal selected by the tuner portion; a display portion that outputs the image signal as an image; a speaker portion that outputs the sound signal as a sound; an operation portion that receives a user's operation; an interface portion that receives an external input signal; a control portion that comprehensively controls operation of each of the portions; and a power supply portion that supplies electric power to each of the portions, wherein the power supply portion includes the switching power supply device having any one of the 2-1 to 2-15 structures.

[Third Invention]

Of the various inventions disclosed in the present specification, the switching power supply device according to the third invention is a switching power supply device of the non-linear control type which generates an output voltage from an input voltage, the switching power supply device includes the structure (the 3-1 structure) which has: a ripple generation circuit that injects a ripple component into a reference voltage; a main comparator that compares a feedback voltage in accordance with an output voltage and the reference voltage after ripple injection with each other to generate a comparison signal; and a switching control portion that performs on/off control of a switch device based on the comparison signal, wherein the ripple generation circuit includes: a correction voltage generation portion that generates a correction voltage in accordance with an on-duty of a pulse voltage that indicates on/off states of the switch device; an addition portion that pulls up the reference voltage before ripple injection in accordance with the correction voltage; a multiplied voltage generation portion that generates a multiplied voltage in accordance with a multiplied value of the on-duty and an off-duty of the pulse voltage; a subtraction portion that pulls down the reference voltage before ripple injection in accordance with the multiplied voltage; and a ripple injection portion that uses the pulse voltage to generate the ripple component and injects the ripple component into the reference voltage after correction, wherein respective circuit constants of the correction voltage generation portion and the addition portion are set such that both a change component of an average ripple value in accordance with the on-duty of the pulse voltage and a change component of the output voltage are cancelled; and respective circuit constants of the multiplied voltage generation portion and the addition portion are set such that a change component of a ripple amplitude in accordance with the multiplied value of the on-duty and off-duty of the pulse voltage is cancelled.

In the meantime, the switching power supply device having the 3-1 structure may have the structure (the 3-2 structure) in which the ripple injection portion includes: a ripple amplifier into a non-inverting input terminal of which the reference voltage after correction is input and from an output terminal of which the reference voltage after ripple injection is output; a first resistor that is connected between an inverting input terminal and the output terminal of the ripple amplifier; a second resistor that is connected between the inverting input terminal of the ripple amplifier and an application terminal for the pulse voltage; and a capacitor that is connected between the inverting input terminal and output terminal of the ripple amplifier.

Besides, the switching power supply device having the 3-2 structure may have the structure (the 3-3 structure) in which the correction voltage generation portion includes a first CR filter that smooths the pulse voltage to generate the correction voltage, and a fourth resistor that cooperates with a third resistor included in the first CR filter to form a voltage division circuit.

Besides, the switching power supply device having the 3-3 structure may have the structure (the 3-4 structure) in which the multiplied voltage generation portion includes: an inverter that receives supply of the correction voltage to operate and generates an inverted pulse voltage that is obtained by inverting the pulse voltage in logic; a second CR filter that smooths the inverted pulse voltage to generate the multiplied voltage; and a sixth resistor that cooperates with a fifth resistor included in the second CR filter to form a voltage division circuit.

Besides, the switching power supply device having the 3-4 structure may have the structure (the 3-5 structure) in which the subtraction portion includes: a buffer into which the reference voltage before ripple injection is input; a seventh resistor whose first terminal is connected to an output terminal of the buffer, whose second terminal is connected to a non-inverting input terminal of the ripple amplifier; and a subtracted current generation circuit that applies the multiplied voltage to an eighth resistor to generate a subtracted current that flows from the output terminal of the buffer to the seventh resistor.

Besides, the switching power supply device having the 3-5 structure may have the structure (the 3-6 structure) in which the addition portion includes: an added current generation circuit that applies the multiplied voltage to a ninth resistor to generate an added current that flows from the seventh resistor to the output terminal of the buffer.

Besides, the switching power supply device having the 3-6 structure may have the structure (the 3-7 structure) in which the following expressions (a1) and (a2) are satisfied among resistance values R1 to R9 of the first to ninth resistors, a capacitance value C1 of the capacitor, a high level voltage Vreg of the pulse voltage, an on-duty Don of the pulse voltage, a drive frequency F of the switch device, and a circuit delay time Td from a time the reference voltage after ripple injection and the feedback voltage cross each other to a time the reference voltage after ripple injection turns down:

$$-\left(\frac{Td}{R2 \times C1} + \frac{R1}{R2}\right) \times Vreg \times Don = \frac{R7}{R9} \times \frac{R4}{R3 + R4} \times Vreg \times Don \quad (a1)$$

$$\frac{1}{2} \times \frac{Vreg}{R2 \times C1 \times F} = \frac{R7}{R8} \times \frac{R6}{R5 + R6} \times \frac{R4}{R3 + R4} \times Vreg \quad (a2)$$

Besides, the switching power supply device having the 3-7 structure may have the structure (the 3-8 structure) in which the capacitance value of the capacitor and the resistance value of the ninth resistor are variably controlled in accordance with a frequency switchover signal for switching the drive frequency of the switch device.

Besides, the television according to the third invention has: a tuner portion that selects, from received signals, a broadcast signal for a desired channel; a decoder portion that generates an image signal and a sound signal from the broadcast signal selected by the tuner portion; a display portion that outputs the image signal as an image; a speaker portion that outputs the sound signal as a sound; an operation portion that receives a user's operation; an interface portion that receives an external input signal; a control portion that comprehensively controls operation each of the portions; and a power supply portion that supplies electric power to each of the portions, wherein the power supply portion includes the switching power supply device having any one of the 3-1 to 3-8 structures.

<Other Modifications>

Besides, the structure of the present invention, in addition to the above embodiments, is variously modifiable without departing from the spirit of the invention. In other words, it should be understood that the above embodiments are examples in all respects and not limiting, and the technological scope of the present invention is not indicated by the above description of the embodiments but by the claims, and all modifications within the scope of the claims and meaning equivalent to the claims are covered.

INDUSTRIAL APPLICABILITY

The switching power supply device according to the present invention is suitably usable in a personal computer (note/desktop type), an LCD [liquid crystal display] television, a PDP [plasma display panel] television, a DVD [digital versatile disc] recorder, a BD [Blu-ray disc] recorder and the like.

LIST OF REFERENCE NUMERALS

A switching power supply device
100 switching power supply IC
1a, 1b N channel type MOS field effect transistors
2a, 2b drivers
3 level shifter
4 drive control circuit
5 main comparator
6 soft start control circuit
7 on-time setting circuit
8 timer
11 reference voltage generation circuit
12a, 12b resistors
13 constant voltage generation circuit
14 diode
15 low voltage lockout circuit
16 thermal shutdown circuit
17 input bias current generation circuit
18 overcurrent protection circuit 19 overvoltage protection circuit
20 ripple generation circuit
30 backward flow detection circuit
31 comparator
32 latch portion
210 correction voltage generation portion
212, 212, 213 resistors
214, 215 capacitors
220 addition portion
221, 225 operational amplifiers
222, 227 resistors
223, 224 P channel type MOS field effect transistors
226 N channel type MOS field effect transistor
230 ripple injection portion
231 operational amplifier (ripple amplifier)
232, 233 resistors
234 capacitor
240 buffer
250 correction voltage auxiliary circuit
251, 252 resistors
253 analog switch
310 multiplied voltage generation portion
311 operational amplifier
312 inverter
313, 314, 315 resistors
316, 317 capacitors
320 subtraction portion
321 operational amplifier
322 N channel type MOS field effect transistor
323 resistor
330 correction voltage generation portion
L1 inductor
D1 diode
R1 to R3 resistors
C1 to C4 capacitors
EN enable terminal
FB feedback terminal
RT on-time setting terminal
SS soft start terminal
BST bootstrap terminal
VIN input terminal
SW switch terminal
GND ground terminal
X television
X0 antenna
X1 tuner portion
X2 decoder portion
X3 display portion
X4 speaker portion
X5 operation portion
X6 interface portion
X7 control portion
X8 power supply portion

What is claimed is:

1. A switching power supply device, comprising:
a reference voltage generation portion that generates a reference voltage;
a ripple injection portion that uses a pulse voltage indicating on/off states of a switch device to generate a ripple component and injects the ripple component into the reference voltage;
a multiplied voltage generation portion that generates a multiplied voltage in accordance with a multiplied value of an on-duty and an off-duty of the pulse voltage;
a subtraction portion that pulls down, in accordance with the multiplied voltage, the reference voltage before ripple injection or a power supply voltage for a buffer that supplies the pulse voltage, which have a constant crest value, to the ripple injection portion;
a comparator that compares a feedback voltage and the reference voltage after ripple injection with each other; and
a switching control portion that performs on/off control of the switch device based on an output signal from the comparator to generate an output voltage from an input voltage in a non-linear control manner.

2. The switching power supply device according to claim 1, wherein
the multiplied voltage generation portion includes:
an inverter that receives supply of a power supply voltage changing in accordance with the on-duty of the pulse voltage to operate and generates an inverted pulse voltage that is obtained by is inverting the pulse voltage in logic; and
a filter portion that smooths the inverted pulse voltage to generate the multiplied voltage.

3. The switching power supply device according to claim 2, wherein
the filter portion includes at least one stage of CR filter that smooths the inverted pulse voltage.

4. The switching power supply device according to claim 3, wherein
the filter portion includes a voltage division resistor that cooperates with a smoothing resistor included in the CR filter to form a voltage division circuit, and a connection node between the smoothing resistor and the voltage division resistor corresponds to an input terminal or an output terminal of the filter portion; and
the switching power supply device further includes a correction voltage generation portion that smooths the pulse voltage to generate a correction voltage in accordance with the on-duty of the pulse voltage, and an addition portion that adds the correction voltage to the reference voltage before ripple injection, wherein
the inverter operates on the correction voltage as a power supply voltage; and
the ripple injection portion includes a first amplifier whose non-inverting input terminal is connected to the addition portion and whose inverting input terminal is connected to an output terminal, and a pulse drive portion that is connected between an input terminal for the pulse voltage and a connection node between the inverting input terminal and output terminal of the first amplifier.

5. The switching power supply device according to claim 1, wherein
the pulse voltage is an on/off signal for the switch device.

6. The switching power supply device according to claim 1, wherein
the pulse voltage is a switch voltage that appears at one terminal of the switch device; and the switching power supply device further has a buffer that supplies the on/off signal or the switch voltage, which have a constant crest value, to the ripple injection portion, the multiplied voltage generation portion and the correction voltage generation portion.

7. The switching power supply device according to claim 1, wherein
the subtraction portion includes:
a second amplifier whose non-inverting input terminal is connected to an input terminal for the reference voltage before ripple injection and whose inverting input terminal is connected to an output terminal;
a first resistor whose first terminal is connected to the output terminal of the second amplifier;

an N channel type transistor whose drain is connected to a second terminal of the first resistor;
a second resistor that is connected between a ground terminal and a source of the transistor; and
a third amplifier whose non-inverting input terminal is connected to an input terminal for the multiplied voltage, whose inverting input terminal is connected to a connection node between the second resistor and the source of the transistor, and whose output terminal is connected to a gate of the transistor.

8. A switching power supply device, comprising:
a ripple generation circuit that injects a ripple component into a reference voltage;
a main comparator that compares a feedback voltage in accordance with an output voltage and the reference voltage after ripple injection with each other to generate a comparison signal; and
a switching control portion that performs on/off control of a switch device based on the comparison signal to generate the output voltage from an input voltage in a non-linear control manner, wherein
the ripple generation circuit includes:
a correction voltage generation portion that generates a correction voltage in accordance with an on-duty of a pulse voltage that indicates on/off states of the switch device;
an addition portion that pulls up the reference voltage before ripple injection in accordance with the correction voltage;
a multiplied voltage generation portion that generates a multiplied voltage in accordance with a multiplied value of the on-duty and an off-duty of the pulse voltage;
a subtraction portion that pulls down the reference voltage before ripple injection in accordance with the multiplied voltage; and
a ripple injection portion that uses the pulse voltage to generate the ripple component and injects the ripple component into the reference voltage after correction, wherein
respective circuit constants of the correction voltage generation portion and the addition portion are set such that both a change component of an average ripple value in accordance with the on-duty of the pulse voltage and a change component of the output voltage are cancelled; and
respective circuit constants of the multiplied voltage generation portion and the addition portion are set such that a change component of a ripple amplitude in accordance with the multiplied value of the on-duty and off-duty of the pulse voltage is cancelled.

9. The switching power supply device according to claim 8, wherein
the ripple injection portion includes:
a ripple amplifier into a non-inverting input terminal of which the reference voltage after correction is input and from an output terminal of which the reference voltage after ripple injection is output;
a first resistor that is connected between an inverting input terminal and the output terminal of the ripple amplifier;
a second resistor that is connected between the inverting input terminal of the ripple amplifier and an application terminal for the pulse voltage; and
a capacitor that is connected between the inverting input terminal and output terminal of the ripple amplifier.

10. The switching power supply device according to claim 9, wherein
the correction voltage generation portion includes a first CR filter that smooths the pulse voltage to generate the correction voltage, and a fourth resistor that cooperates with a third resistor included in the first CR filter to form a voltage division circuit.

11. The switching power supply device according to claim 10, wherein
the multiplied voltage generation portion includes:
an inverter that receives supply of the correction voltage to operate and generates an inverted pulse voltage that is obtained by inverting the pulse voltage in logic;
a second CR filter that smooths the inverted pulse voltage to generate the multiplied voltage; and
a sixth resistor that cooperates with a fifth resistor included in the second CR filter to form a voltage division circuit;
the subtraction portion includes:
a buffer into which the reference voltage before ripple injection is input;
a seventh resistor whose first terminal is connected to an output terminal of the buffer, whose second terminal is connected to a non-inverting input terminal of the ripple amplifier; and
a subtracted current generation circuit that applies the multiplied voltage to an eighth resistor to generate a subtracted current that flows from the output terminal of the buffer to the seventh resistor;
the addition portion includes:
an added current generation circuit that applies the multiplied voltage to a ninth resistor to generate an added current that flows from the seventh resistor to the output terminal of the buffer, wherein
following expressions (a1) and (a2) are satisfied among resistance values R1 to R9 of the first to ninth resistors, a capacitance value C1 of the capacitor, a high level voltage Vreg of the pulse voltage, an on-duty Don of the pulse voltage, a drive frequency F of the switch device, and a circuit delay time Td from a time the reference voltage after ripple injection and the feedback voltage cross each other to a time the reference voltage after ripple injection turns down:

$$-\left(\frac{Td}{R2 \times C1} + \frac{R1}{R2}\right) \times Vreg \times Don = \frac{R7}{R9} \times \frac{R4}{R3+R4} \times Vreg \times Don \quad (a1)$$

$$\frac{1}{2} \times \frac{Vreg}{R2 \times C1 \times F} = \frac{R7}{R8} \times \frac{R6}{R5+R6} \times \frac{R4}{R3+R4} \times Vreg \quad (a2)$$

wherein the capacitance value of the capacitor and the resistance value of the ninth resistor are variably controlled in accordance with a frequency switchover signal for switching the drive frequency of the switch device.

12. A switching power supply device, comprising:
a reference voltage generation portion that generates a reference voltage;
a ripple injection portion that uses a pulse voltage indicating on/off states of a switch device to generate a ripple component and injects the ripple component into the reference voltage;
a correction voltage generation portion that generates a correction voltage in accordance with a duty of the pulse voltage;
an addition portion that adds the correction voltage to the reference voltage before ripple injection;

a main comparator that compares a feedback voltage and the reference voltage after ripple injection with each other; and a switching control portion that performs on/off control of the switch device based on an output signal from the main comparator to generate an output voltage from an input voltage in a non-linear control manner.

13. The switching power supply device according to claim 12, wherein
the correction voltage generation portion includes at least one stage of CR filter that smooths the pulse voltage to generate the correction voltage.

14. The switching power supply device according to claim 13, wherein
the correction voltage generation portion includes a second resistor that cooperates with a first resistor included in the CR filter to form a voltage division circuit, and a connection node between the first resistor and the second resistor corresponds to an input terminal for the pulse voltage or an output terminal for the correction voltage.

15. The switching power supply device according to claim 12, wherein
the addition portion includes:
a second amplifier whose non-inverting input terminal is connected to an input terminal for the reference voltage before ripple injection and whose inverting input terminal is connected to an output terminal;
a third resistor whose first terminal is connected to an output terminal of the second amplifier;
a fourth resistor that is connected between a ground terminal and a source of an N channel type transistor;
a third amplifier whose non-inverting input terminal is connected to an input terminal for the correction voltage, whose inverting input terminal is connected to a connection node between the fourth resistor and the source of the transistor, and whose output terminal is connected to a gate of the transistor; and
a current mirror portion whose first terminal is connected to a second terminal of the third resistor and whose second terminal is connected to a drain of the transistor.

16. The switching power supply device according to claim 12, further comprising:
a backward flow current detection circuit that detects a backward flow current to the switch device, wherein
the switching control portion forcibly turns off the switch device when the backward flow current is detected.

17. The switching power supply device according to claim 16, further comprising:
a correction voltage auxiliary circuit that applies an auxiliary voltage to an application terminal for the correction voltage when the backward flow current is detected.

18. The switching power supply device according to claim 17, wherein
the correction voltage auxiliary circuit includes:
a voltage division circuit that divides the output voltage to generate the auxiliary voltage; and
an analog switch that performs connection/disconnection between the application terminal for the correction voltage and an application terminal for the auxiliary voltage in accordance with detection/non-detection of the backward flow current.

19. The switching power supply device according to claim 18, wherein
the switch device is connected between one terminal of an inductor and an application terminal for a ground voltage;
during an on-duration of the switch device, the backward flow current detection circuit monitors a zero crossing point, where a switch voltage appearing at one terminal of the switch device changes from negative to positive, to detect the backward flow current to the switch device;
the backward flow current detection circuit includes:
a comparator that compares the switch voltage and the ground voltage with each other to generate a zero crossing detection signal; and
a latch portion that generates a skip signal which is set to a first logic level by a pulse edge of the zero crossing detection signal and reset to a second logic level by a pulse edge of the comparison signal, wherein
the switching control portion forcibly turns off the switch device during a time the skip signal is kept at the first logic level; and
the correction voltage auxiliary circuit applies the auxiliary voltage to the application terminal for the correction voltage during a time the skip signal is kept at the first logic level.

20. A television comprising:
a tuner portion that selects, from received signals, a broadcast signal for a desired channel;
a decoder portion that generates an image signal and a sound signal from the broadcast signal selected by the tuner portion;
a display portion that outputs the image signal as an image;
a speaker portion that outputs the sound signal as a sound;
an operation portion that receives a user's operation;
an interface portion that receives an external input signal;
a control portion that comprehensively controls operation each of the portions; and
a power supply portion that supplies electric power to each of the portions, wherein
the power supply portion includes a switching power supply device according to claim 1.

* * * * *